(12) United States Patent
Nakagawa

(10) Patent No.: US 8,320,057 B2
(45) Date of Patent: Nov. 27, 2012

(54) LENS UNIT AND IMAGE CAPTURING DEVICE

(75) Inventor: Youhei Nakagawa, Neyagawa (JP)

(73) Assignee: Sanyo Electric Co., Ltd. (JP)

( * ) Notice: Subject to any disclaimer, the term of this patent is extended or adjusted under 35 U.S.C. 154(b) by 98 days.

(21) Appl. No.: 12/556,414

(22) Filed: Sep. 9, 2009

(65) Prior Publication Data

US 2010/0110563 A1 May 6, 2010

(30) Foreign Application Priority Data

Oct. 31, 2008 (JP) ................................. 2008-282396

(51) Int. Cl.
*G02B 13/18* (2006.01)
*G02B 9/36* (2006.01)
(52) U.S. Cl. ........................ 359/715; 359/772
(58) Field of Classification Search .......... 359/713–715, 359/771–774
See application file for complete search history.

(56) References Cited

U.S. PATENT DOCUMENTS

| | | | | |
|---|---|---|---|---|
| 7,355,801 B2 * | 4/2008 | Chen et al. | | 359/773 |
| 7,643,225 B1 * | 1/2010 | Tsai | | 359/715 |
| 7,826,149 B2 * | 11/2010 | Tang et al. | | 359/715 |
| 7,826,151 B2 * | 11/2010 | Tsai | | 359/764 |
| 7,859,771 B2 * | 12/2010 | Yin et al. | | 359/773 |
| 7,880,980 B2 * | 2/2011 | Nio | | 359/773 |
| 2006/0238894 A1 * | 10/2006 | Sano | | 359/714 |
| 2008/0130140 A1 * | 6/2008 | Shin | | 359/773 |
| 2009/0034099 A1 * | 2/2009 | Nakamura | | 359/773 |
| 2011/0188131 A1 * | 8/2011 | Sano | | 359/714 |

FOREIGN PATENT DOCUMENTS

| | | |
|---|---|---|
| JP | 2002-228922 | 8/2002 |
| JP | 2006-309043 | 9/2006 |
| JP | 2007-011237 | 1/2007 |
| WO | WO 2008/078708 | * 7/2008 |

* cited by examiner

*Primary Examiner* — Jordan Schwartz
(74) *Attorney, Agent, or Firm* — Sheridan Ross P.C.

(57) ABSTRACT

A lens unit includes a first lens having positive power, an aperture stop, a meniscal second lens having negative power, a meniscal third lens having positive power, and a fourth lens including an object side surface and an image side surface, each being aspherical and including at least one inflection point. The image side surface is concave at an image side. The first lens, the aperture stop, the second lens, the third lens, and the fourth lens are arranged in order from an object side toward the image side. The first lens includes an image side surface that is convex at the image side. The second lens includes an object side surface that is convex at the object side.

6 Claims, 28 Drawing Sheets

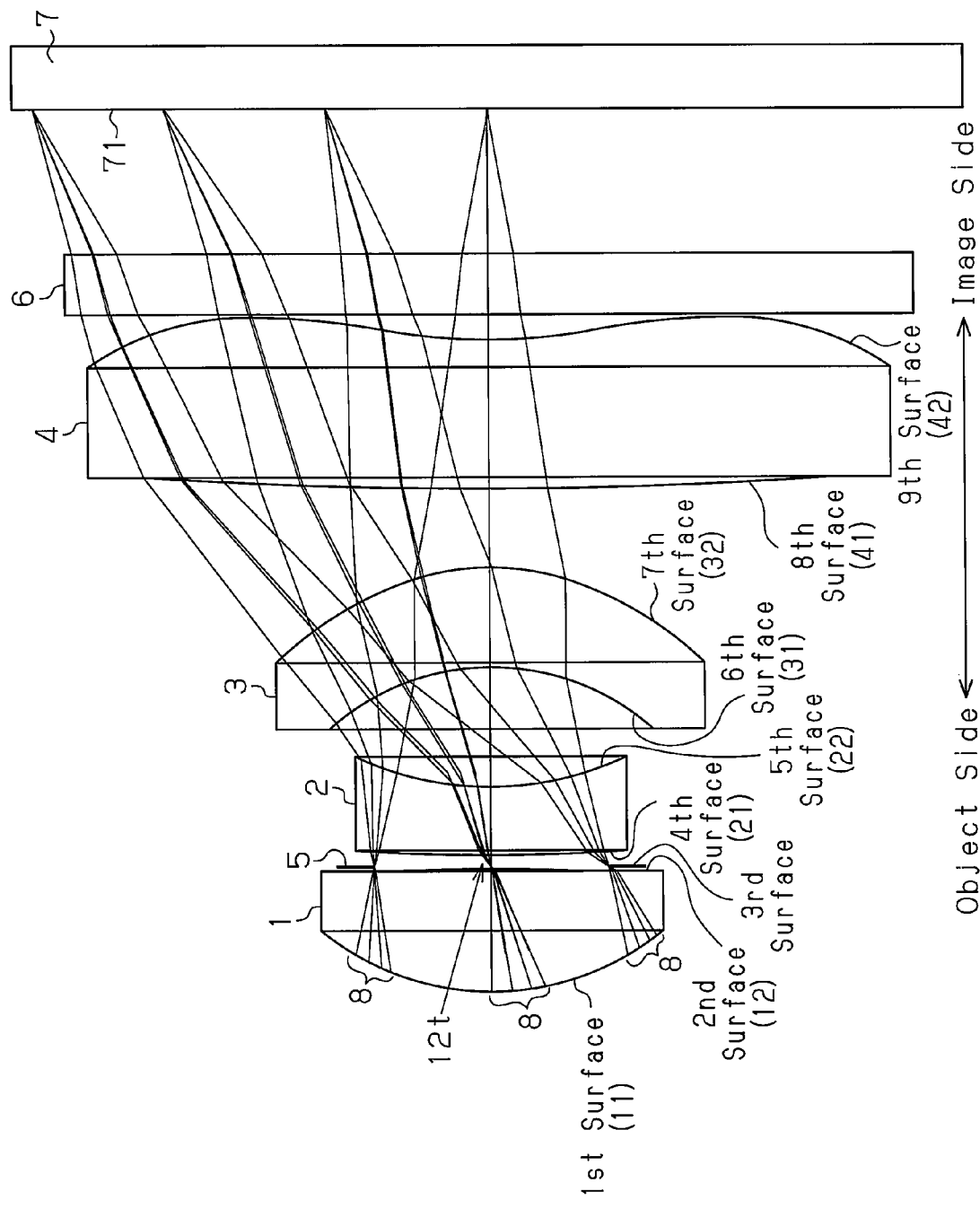

Spot Diagram

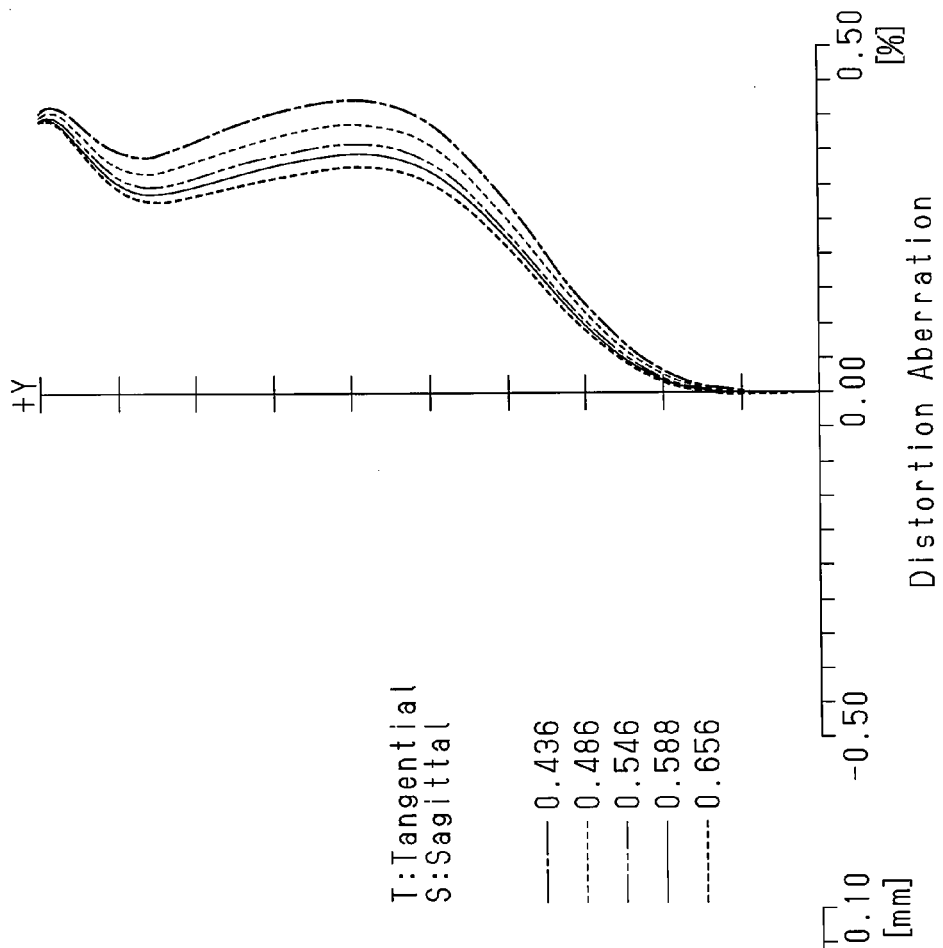
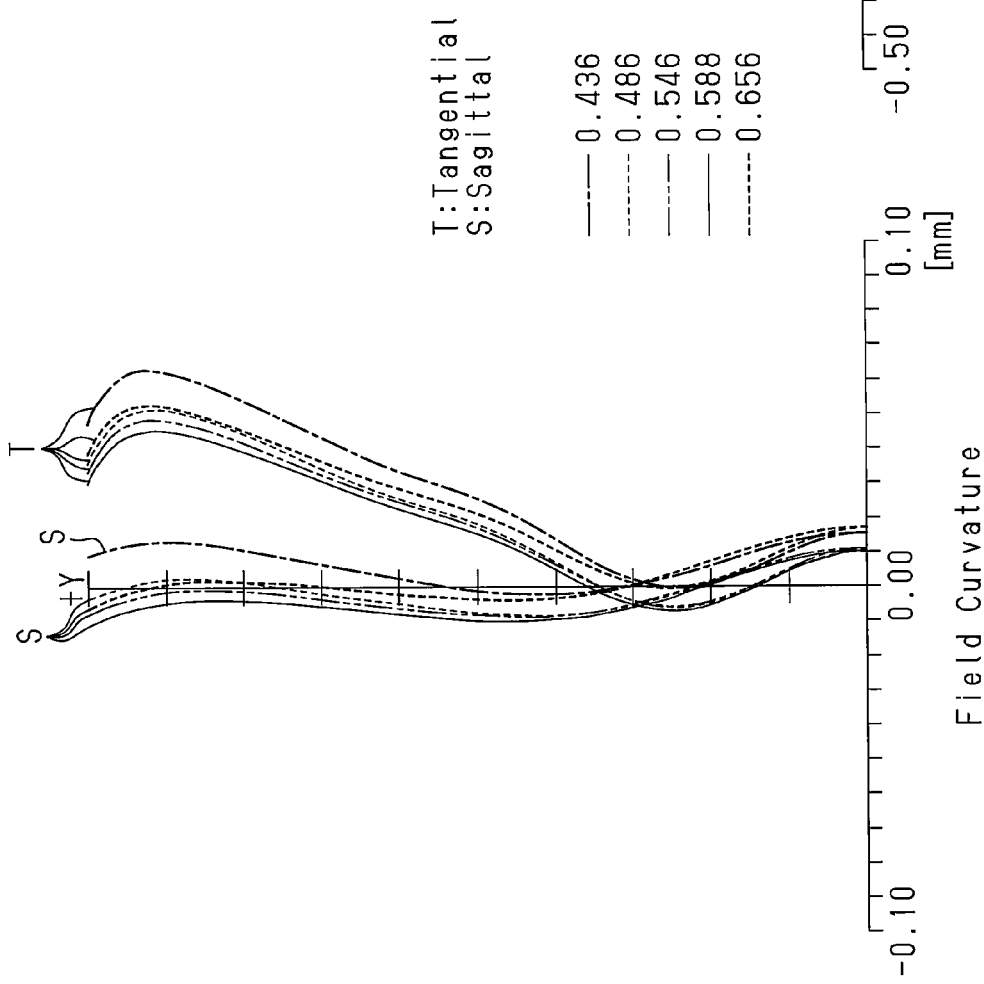

Spot Diagram

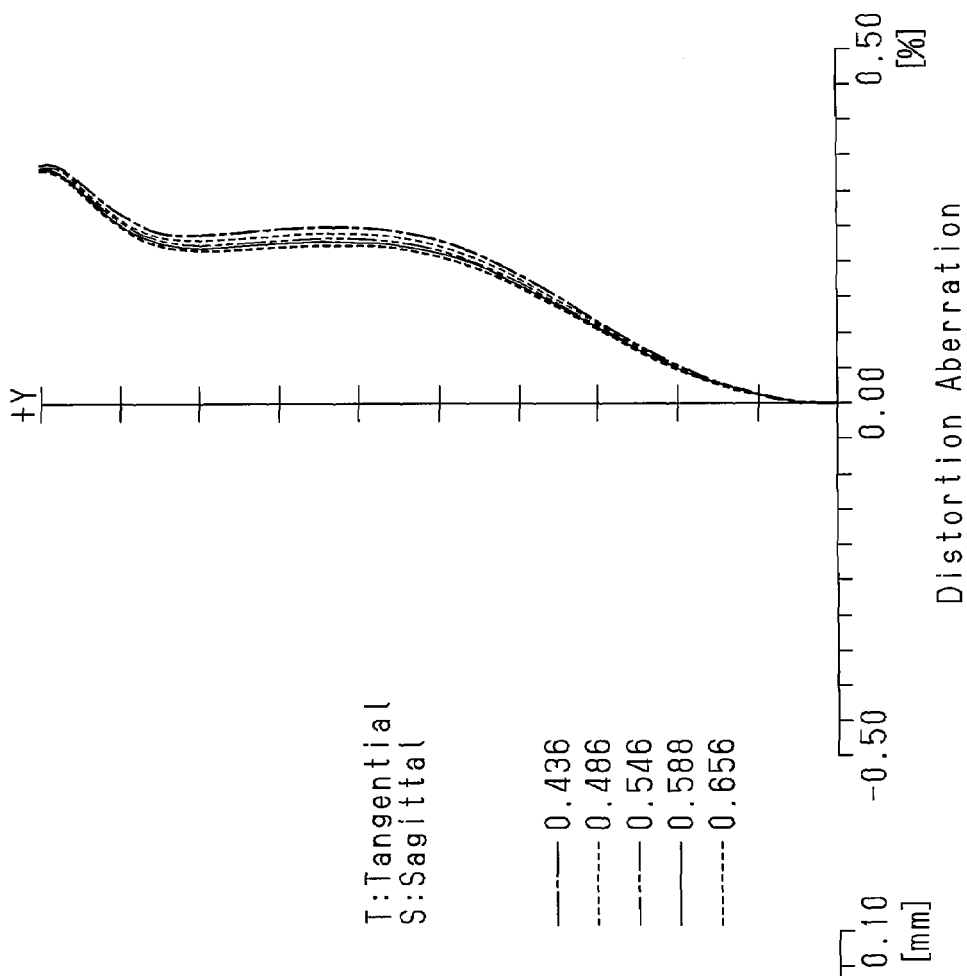
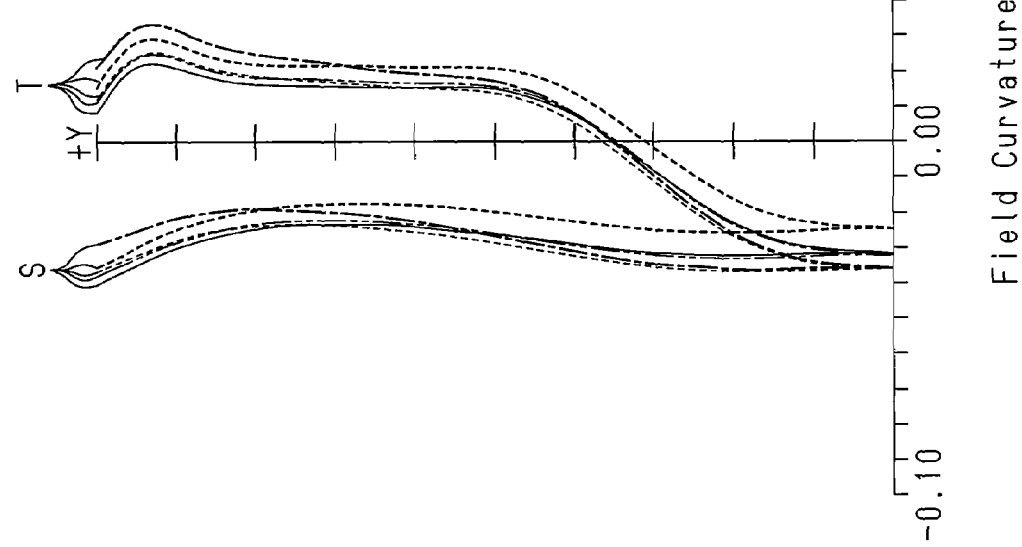

Spot Diagram

LENS UNIT AND IMAGE CAPTURING DEVICE

CROSS-REFERENCE TO RELATED APPLICATIONS

This application is based upon and claims the benefit of priority from prior Japanese Patent Application No. 2008-282396, filed on Oct. 31, 2008, the entire contents of which are incorporated herein by reference.

BACKGROUND OF THE INVENTION

The present invention relates to a lens unit, and more particularly, to a lens unit suitable for use in a compact image capturing device. Further, the present invention relates to an image capturing device.

Most image capturing devices that are presently being used are digital cameras, which use charged coupled device (CCD) image sensors or complementary metal oxide semiconductor (CMOS) image sensors as image capturing elements. Thus, such an image capturing device must use a lens unit of which capacities differ from that of a so-called silver salt camera. For example, the sensitivity to diagonal incident light is lower in a CCD image sensor or CMOS image sensor than in a silver salt film. Thus, a CCD image sensor or CMOS image sensor must have a small chief ray angle (CRA), which is the incident angle of light rays entering an image capturing device. Due to the improvements made on the integration of image capturing elements, the image quality must be improved even for lens units used in compact camera or mobile phones. At the same time, such a lens unit must be reduced in size. Furthermore, a lens unit that is compact and used in a compact camera or mobile phone must have a structure that lowers manufacturing costs so that relatively inexpensive products can be supplied.

To improve the image quality, aberrations must be lowered. Thus, instead of a lens unit having a three-lens structure, which may easily be designed to be compact, it is desirable that a lens unit having a four-lens structure be used, which more easily suppresses aberrations. Japanese Laid-Open Patent Publication Nos. 2002-228922, 2006-309043, and 2007-11237 describe compact lens units having four-lens structures.

Japanese Laid-Open Patent Publication Nos. 2002-228922 describes a so-called front stop lens system in which a stop is located further toward an object side from the lens located closest to the image capturing subject (hereinafter referred to as the "object side"). In such a structure, it is generally known that when misalignment occurs in a lens located toward an image capturing element side (hereinafter referred to as the "image side") from the stop, the misalignment greatly affects the image quality. As a result, there is a tendency for product defects to occur due to such misalignment. This lowers the manufacturing yield of the lens unit and increases manufacturing costs.

Japanese Laid-Open Patent Publication No. 2006-309043 describes a so-called rear stop lens system in which a stop is arranged further rearward from two lenses that are located at the object side. It is generally known that such a structure obtains a greater chief ray angle (CRA) than a front stop structure. It is strongly required that the CRA be small for a lens unit for a digital camera. Thus, the refractive index of each lens must be adjusted to decrease the CRA. However, when increasing the thickness of each lens or the gap between lenses to adjust the refractive index, the entire length of the lens unit is consequently increased. This enlarges the lens unit.

Japanese Laid-Open Patent Publication No. 2007-11237 describes a so-called middle stop lens system in which a stop is arranged between the first lens, which is located at the object side, and the second lens. This structure generally produces less defective products that are caused by misalignments than the lens system of Japanese Laid-Open Patent Publication No. 2002-228922 and has a smaller CRA than the lens system of Japanese Laid-Open Patent Publication No. 2006-309043.

Japanese Laid-Open Patent Publication No. 2007-11237 recites in paragraph [0013] that "by forming the two lenses at the object side from material having a relatively small linear expansion coefficient as expressed by conditional equations (3) and (4), a lens system may have small focusing movements and be applicable to temperature changes." In other words, by forming the "two lenses at the object side" from a suitable material, the influence of temperature changes may be suppressed.

However, for compact cameras and mobile phones, it is required that every one of the lenses in lens units be plastic to lower weight and cost. The linear expansion coefficient of plastic is greater than glass. Thus, when the lenses are all plastic, the two lenses at the object side would not be formed from a material having a relatively low linear expansion coefficient.

SUMMARY OF THE INVENTION

The present invention provides a lens unit having a middle stop structure that lowers the influence of temperature changes regardless of the material of each lens in the lens unit. Further, the present invention provides an image capturing device having an image capturing function, such as a camera or a mobile phone incorporating a camera, and including such a lens unit.

One aspect of the present invention is a lens unit including a first lens having positive power, an aperture stop, a meniscal second lens having negative power, a meniscal third lens having positive power, and a fourth lens including an object side surface and an image side surface, each being aspherical and including at least one inflection point. The image side surface is concave at an image side. The first lens, the aperture stop, the second lens, the third lens, and the fourth lens are arranged in order from an object side toward the image side. The first lens includes an image side surface that is convex at the image side. The second lens includes an object side surface that is convex at the object side.

A further aspect of the present invention is an image capturing device provided with a lens unit including a first lens having positive power, an aperture stop, a meniscal second lens having negative power, a meniscal third lens having positive power, and a fourth lens including an object side surface and an image side surface, each being aspherical and including at least one inflection point. The image side surface is concave at an image side. The first lens, the aperture stop, the second lens, the third lens, and the fourth lens are arranged in order from an object side toward the image side. The first lens includes an image side surface that is convex at the image side. The second lens includes an object side surface that is convex at the object side.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 includes external views showing the portable terminal when in use.

FIG. 3 is a schematic cross-sectional view showing a first embodiment of a lens unit taken along a plane which includes the optical axis of the lens unit;

FIG. 4 includes diagrams each showing the temperature characteristics of the first embodiment of the lens unit.

FIG. 6 includes graphs each showing one of the characteristics of a lens unit in example 1, FIG. 6A is a graph showing the field curvature, and FIG. 6B is a graph showing the distortion aberration;

FIG. 11 includes graphs each showing one of the characteristics of the lens unit in example 2.

FIG. 16 includes graphs each showing one of the characteristics of the lens unit in example 3, FIG. 16A is a graph showing the field curvature, and FIG. 16B is a graph showing the distortion aberration;

FIG. 21A is a graph showing the field curvature, and FIG. 21B is a graph showing the distortion aberration;

FIG. 26A is a graph showing the field curvature, and FIG. 26B is a graph showing the distortion aberration;

DETAILED DESCRIPTION OF THE PREFERRED EMBODIMENTS

Figure 1:
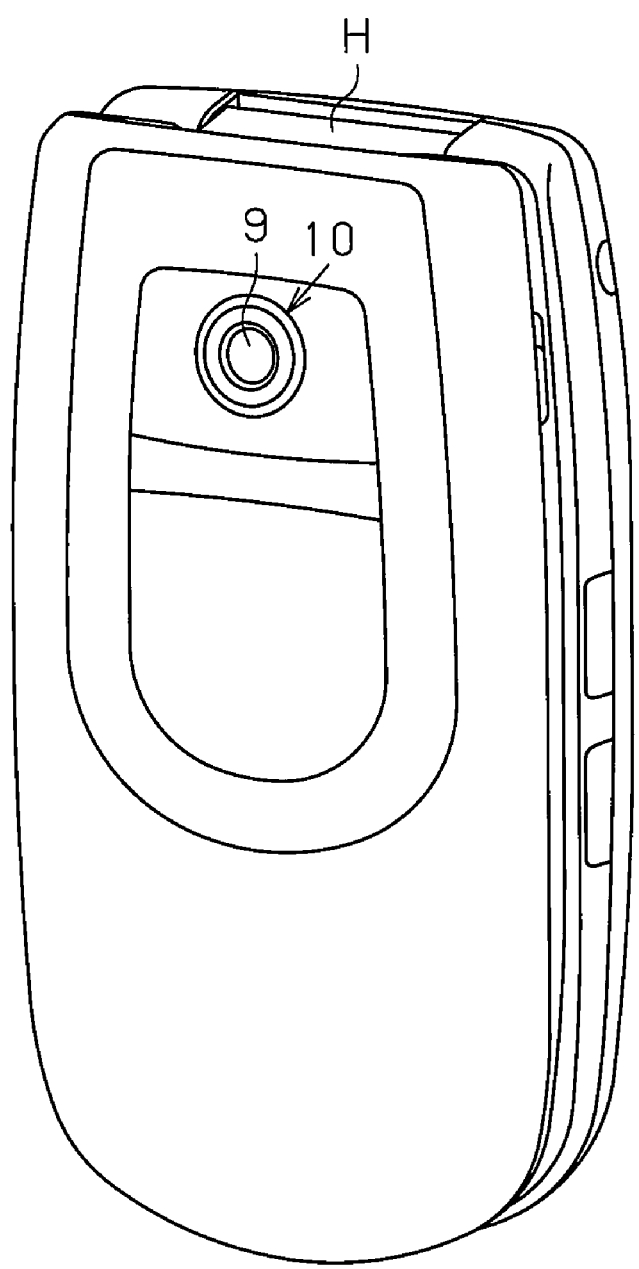
FIG. 1 is an external view showing the outer appearance of a portable terminal when not in use.

In the drawings, like numerals are used for like elements throughout.

First Embodiment

Figure 2A:
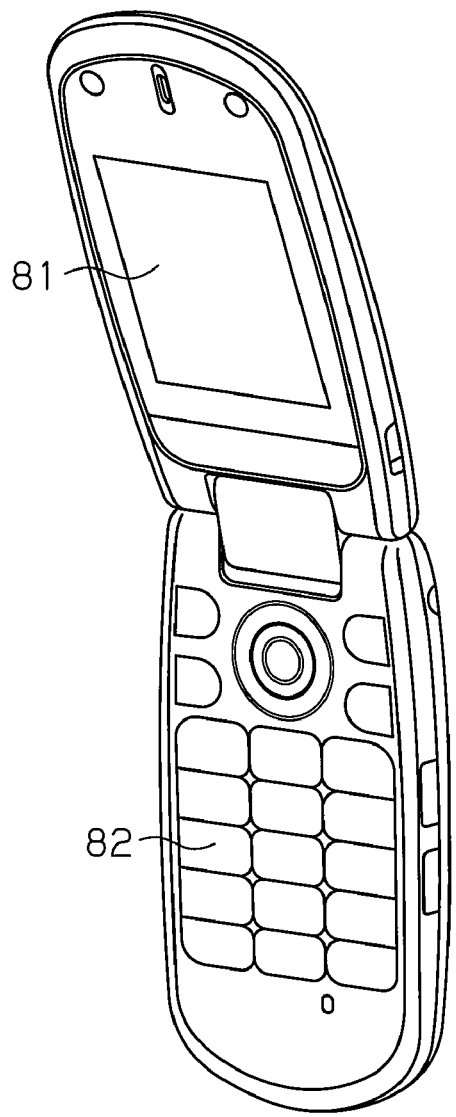
FIG. 2A is a front perspective view and FIG. 2B is a rear perspective view.
Figure 2B:
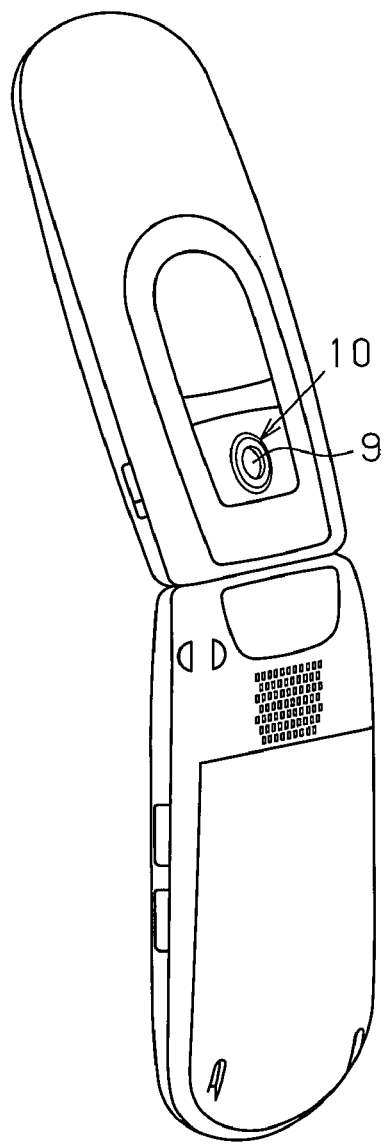

A first embodiment of an image capturing device according to the present invention will now be discussed with reference to the drawings. As shown in FIG. 1, a preferred embodiment of a mobile phone has, for example, a folding structure that folds about a hinge H. FIG. 1 shows the mobile phone in a folded, or closed state. A cover glass 9, which is part of a lens unit 10, is exposed from the front surface of the mobile phone. FIG. 2A shows the mobile phone in an open state. A display 81 and an operation panel 82 are arranged on the front surfaces of the mobile phone as viewed in FIG. 2A. FIG. 2B is a rear view of the mobile phone in an open state. In this state, to capture an image of an object, for example, a user opens the mobile phone, directs the cover glass 9 toward the object, and operates the operation panel 82 to release the shutter.

Referring to FIG. 3, the lens unit 10 is a middle stop type lens unit including, in order of arrangement from the object side toward the image side, a first lens 1, an aperture stop 5, a second lens 2, a third lens 3, a fourth lens 4, and a cover glass 6. Members that particularly do not have to be described, such as the cover glass 9 and frame, are not shown in FIG. 3. FIG. 3 shows a CCD image sensor 7, which is not an element of the lens unit, to illustrate an imaging plane 71. FIG. 3 also shows incident light 8. Each of the first lens 1, second lens 2, third lens 3, and fourth lens 4 is a plastic lens. The structure shown in FIG. 3 will now be described in detail.

The first lens 1 has an object side surface 11 (first surface), which is convex at the object side, and an image side surface 12 (second surface), which is convex at the image side. The first lens 1 is a lens having positive power (hereinafter simply referred to as a "positive lens"). Further, the second lens 2 has an object side surface 21 (fourth surface), which is convex at the object side, and an image side surface 22 (fifth surface), which is concave at the image side. The second lens 2 is a lens having negative power (hereinafter simply referred to as a "negative lens") and is a lens having a meniscal shape (hereinafter simply referred to as a meniscus lens).

Further, the image side surface 12 of the first lens 1 is convex at the image side, and the object side surface 21 of the second lens 2 is convex at the object side. That is, the opposing surfaces of the first lens 1 and the second lens 2 are both convex and thereby suppress changes in the optical path that would be caused by deformation of the first lens 1 and the second lens 2 resulting from temperature changes. This is because the two opposing surfaces sandwiching the aperture stop have surface shapes that are close to symmetric. As a result, even if the refractive index changes at the surface located immediately ahead of the stop 5, namely, the second surface (12), this may be corrected by the change in the refractive index of the surface located immediately behind the stop 5, namely, the fourth surface (21).

Figure 4A:
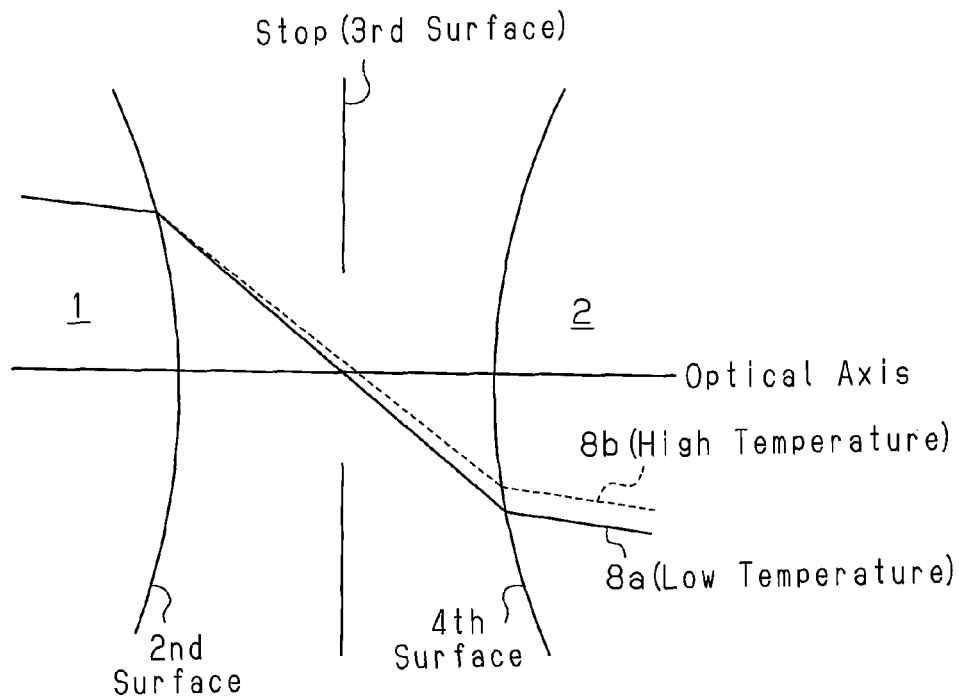
FIG. 4A is a diagram showing displacement of a light path when opposing surfaces of first and second lens at opposite sides of a stop have a symmetrical shape.

More specifically, referring to FIG. 4A, when the temperature is low, light is refracted at the second surface and further refracted at the fourth surface to be directed toward the fifth surface along an optical path 8a, as shown by the solid lines. When the temperature is high, the refractive index of the first lens 1 becomes lower than that when the temperature is low. Thus, the refraction of light at the second surface becomes small as shown by the broken lines. Accordingly, the incident angle of light at the fourth surface becomes smaller than that when the temperature is low. As a result, an optical path 8b is directed toward the fifth surface substantially parallel to the optical path 8a. In this manner, when the temperature is high, the refractive index of the second surface and the refractive index of the fourth surface both become small and function to cancel the influence of optical path changes.

If the opposing surfaces sandwiching the stop were to be asymmetrical as in the prior art, changes in the optical path caused by temperature changes cannot be suppressed. For example, a case in which the image side surface of the first lens 1 is convex at the image side and the object side surface of the second lens 2 is concave at the object side will now be discussed in detail.

Figure 4B:
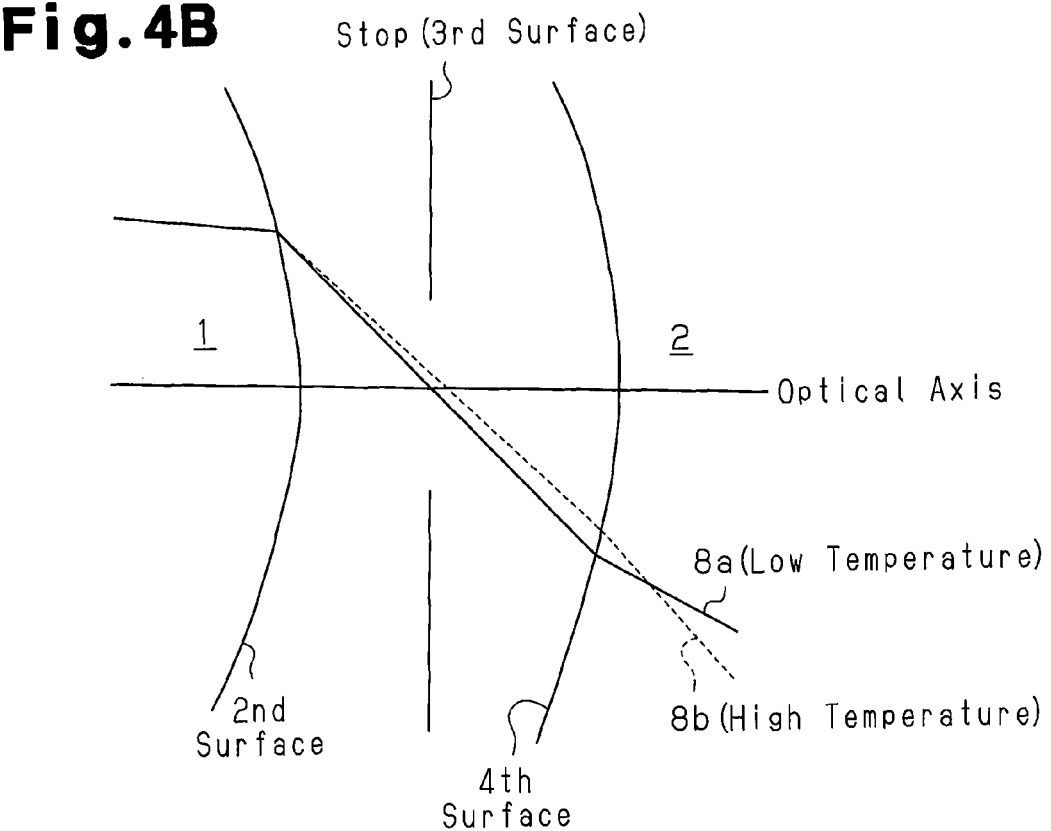
FIG. 4B is a diagram showing displacement of a light path when opposing surfaces of first and second lens at opposite sides of a stop have an asymmetrical shape.
Figure 5:
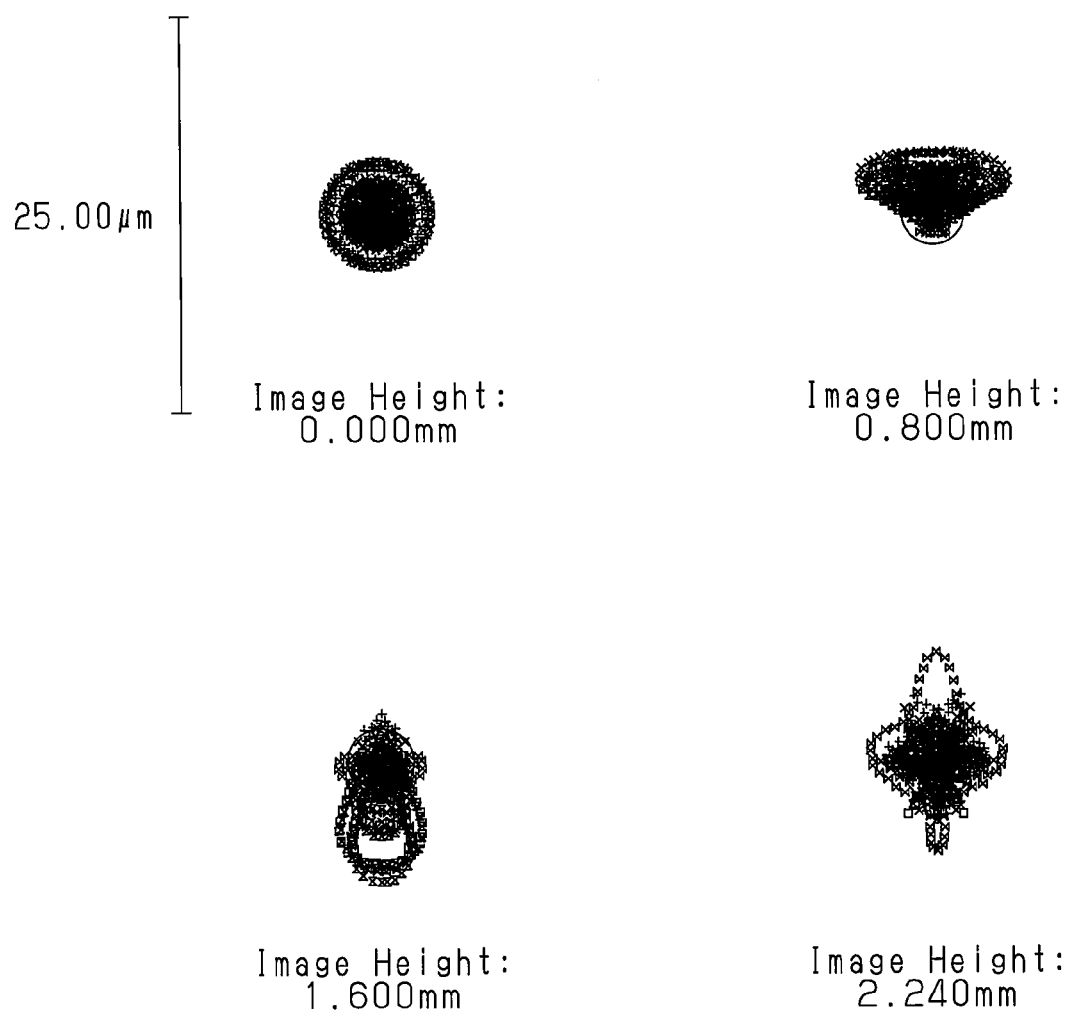
FIG. 5 is a spot diagram showing one of the characteristics of a lens unit in example 1.
Figure 7:
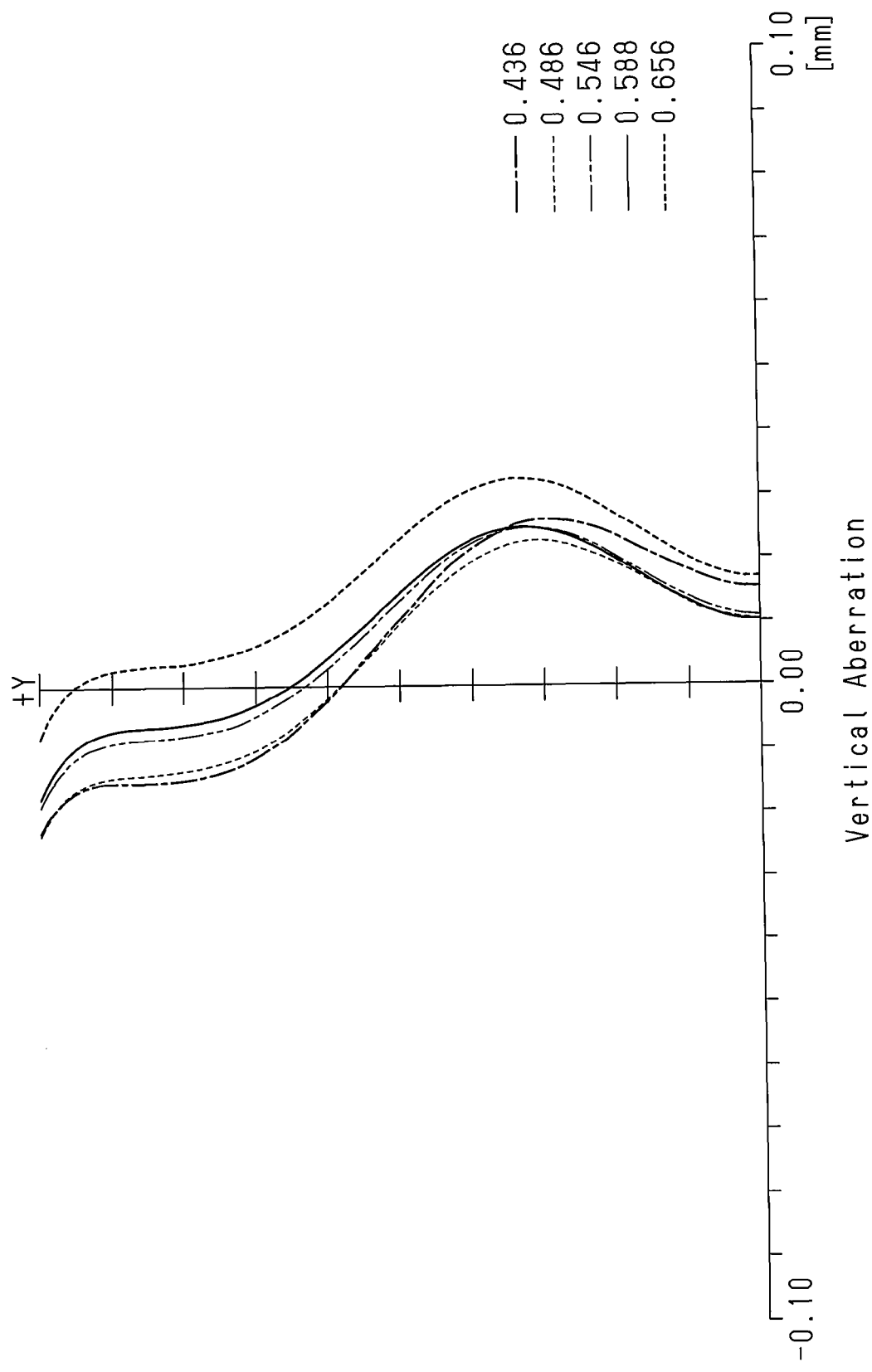
FIG. 7 is a graph showing the vertical aberration, which represents one of the characteristics of the lens unit in example 1.
Figure 8:
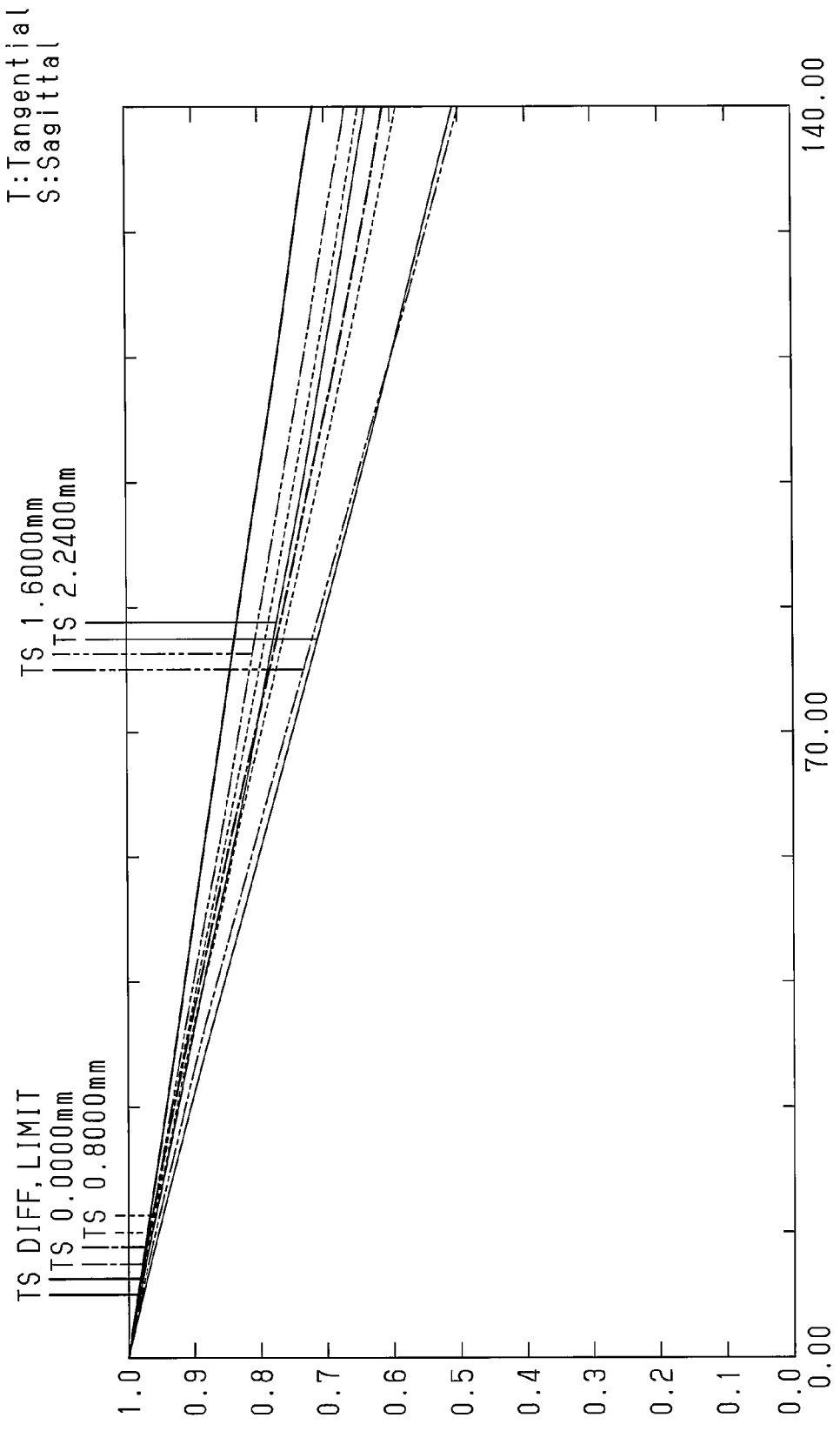
FIG. 8 is a graph showing the transfer function (MTF), which represents one of the characteristics of the lens unit in example 1.

For example, referring to FIG. 4B, when the temperature is low, light is refracted at the second surface and further refracted at the fourth surface to be directed toward the fifth surface along an optical path 8a, as shown by the solid lines. When the temperature is high, the refractive index of the first lens 1 becomes lower than that when the temperature is low. Thus, the refraction of light at the second surface becomes small as shown by the broken lines. In this case, the fourth surface is concave at the object side. As a result, as the incident angle becomes smaller, light enters the fourth surface at a location having a smaller curvature. Further, since the refractive index of the fourth surface is small, the refraction of light that enters the fourth surface is small. Therefore, the optical path 8b becomes farther from the optical path 8a as it heads toward the fifth surface. In this manner, when the temperature is high, the refractive index of the second surface and the refractive index of the fourth surface both become small and function to increase the influence of optical path changes.

The opposing surfaces of the first lens 1 and the second lens 2 sandwiching the stop 5 are symmetrical to each other. This allows for satisfactory correction of coma aberrations as described, for example, in Japanese Laid-Open Patent Publication No. 2006-301403 at paragraph [0018].

Furthermore, the third lens 3 is a meniscus lens having positive power and including an object side surface 31, which is concave at the object side, and an image side surface 32, which is convex at the image side. The third lens 3 is a positive lens and thereby condenses the light that has passed through the second lens. Further, the third lens 3 is meniscal and thereby further suppresses aberrations remaining in the light that has passed through the second lens 2.

The fourth lens 4 includes an object side surface 41 and an image side surface 42. The image side surface 42 and the object side surface 41 are each aspherical and include at least one inflection point. The image side surface 42 is concave at the image side. More specifically, the object side surface 41 (eighth surface) includes a convex central portion at the object side. Further, the object side surface 41 has a curvature that decreases toward the peripheral portion and includes an inflection point. The image side surface 42 (ninth surface) includes a concave central portion at the image side. Further, the image side surface 42 has a curvature that decreases toward the peripheral portion and includes an inflection point. The peripheral portion of the image side surface 42 is concave at the image side. The fourth lens 4 has negative power. Due to the fourth lens 4, aberrations remaining in the light that has passed through the first to third lens 1 to 3 is further suppressed.

A colorless, transparent glass plate is normally used as a cover glass 6 to protect the CCD image sensor 7, which is an image capturing element, from dust or the like. When necessary, a filter, such as an infrared cut filter, is used.

In the lens unit of the first embodiment, the first lens 1 condenses light, and the aperture stop 5 restricts the passage of the incident light 8 to an amount required for imaging. The light that has passed through the aperture stop 5 further passes through the second to fourth lens 2 to 4. This condenses the light and corrects aberrations. The light that has passed through the fourth lens 4 further passes through the cover glass 6 and is then imaged on the imaging plane 71 of the CCD image sensor 7. The CCD image sensor 7 performs an electrical conversion with the image so as to record a photographic image when the shutter is released.

The lens unit of the first embodiment has the advantages described below.

(1) The image side surface 12 (second surface) of the first lens is convex at the image side, and the object side surface 21 (fourth surface) of the second lens 2 is convex at the object side. That is, the opposing surfaces of the first lens 1 and second lens 2 are both convex. Thus, the opposing surfaces of the first lens 1 and second lens 2 sandwiching the aperture stop 5 are symmetrical. This allows for cancellation of changes in the optical path caused by deformation of the first lens 1 and the second lens 2 when the temperature changes regardless of the material of the first and second lenses 1 and 2. Thus, the influence of temperature changes is suppressed.

(2) The fourth lens 4 has negative power. Thus, a long back focus may be provided, and the chief ray angle (CRA) may be decreased. The lens unit is thus further optimal for use in a digital camera.

(3) Due to the above-described advantages (1) and (2), an image capturing device including the lens unit 10 is compact, light, and subtly affected by the influence of temperature changes.

(4) The central portion in the object side surface 41 (eighth surface) of the fourth lens 4 is convex at the central portion. This facilitates the correction of aberrations remaining in the light that has passed through the first to third lenses 1 to 3.

Second Embodiment

A second embodiment of an imaging capturing device according to the present invention and applied to a mobile phone will now be discussed with reference to the drawings. The second embodiment differs from the first embodiment only in the location of the aperture stop 5. Thus, parts that are the same as the first embodiment will not be described in detail.

Figure 14:
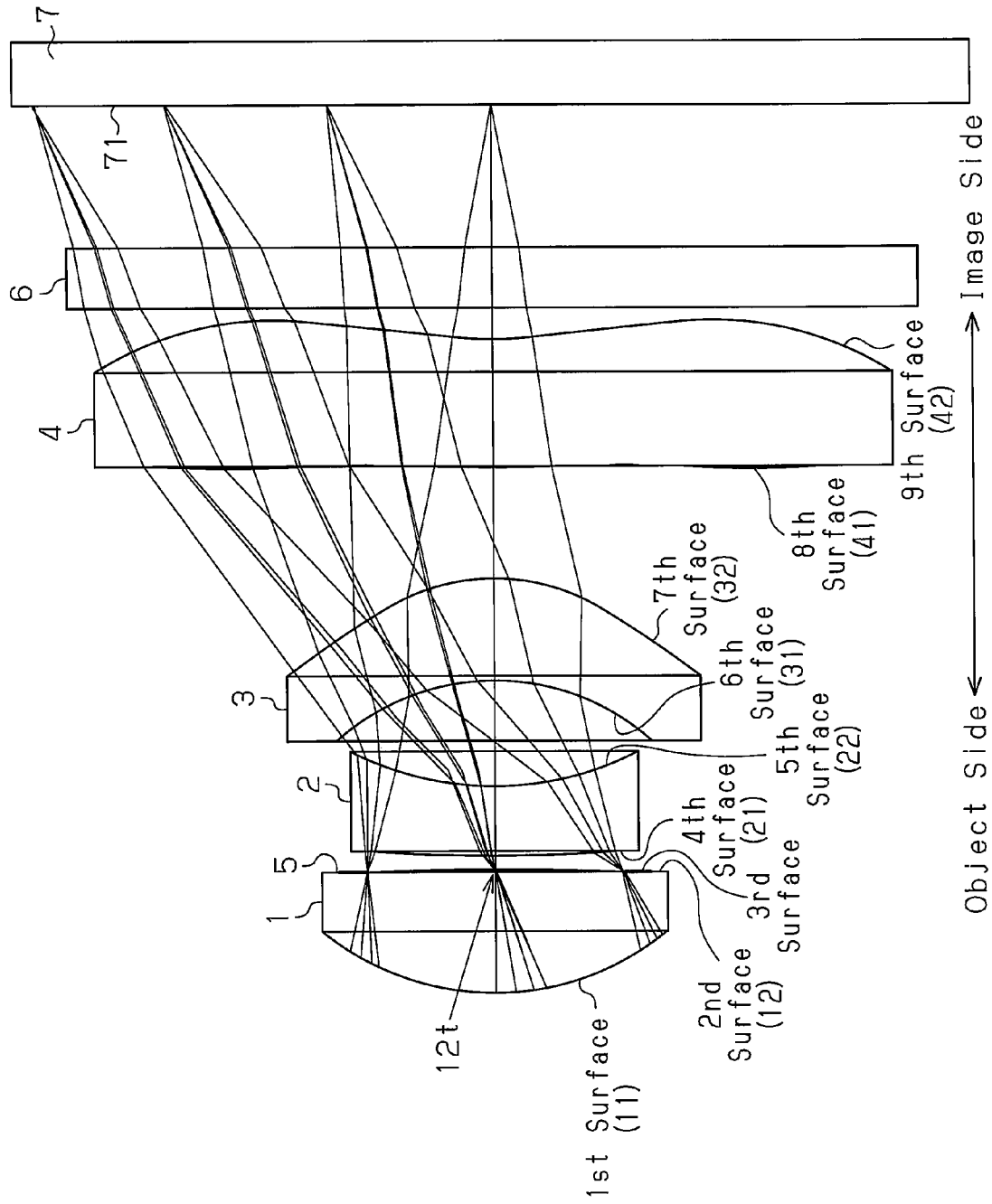
FIG. 14 is a schematic cross-sectional view showing a second embodiment of a lens unit in example 3 taken along a plane which includes the optical axis of the lens unit.
Figure 15:
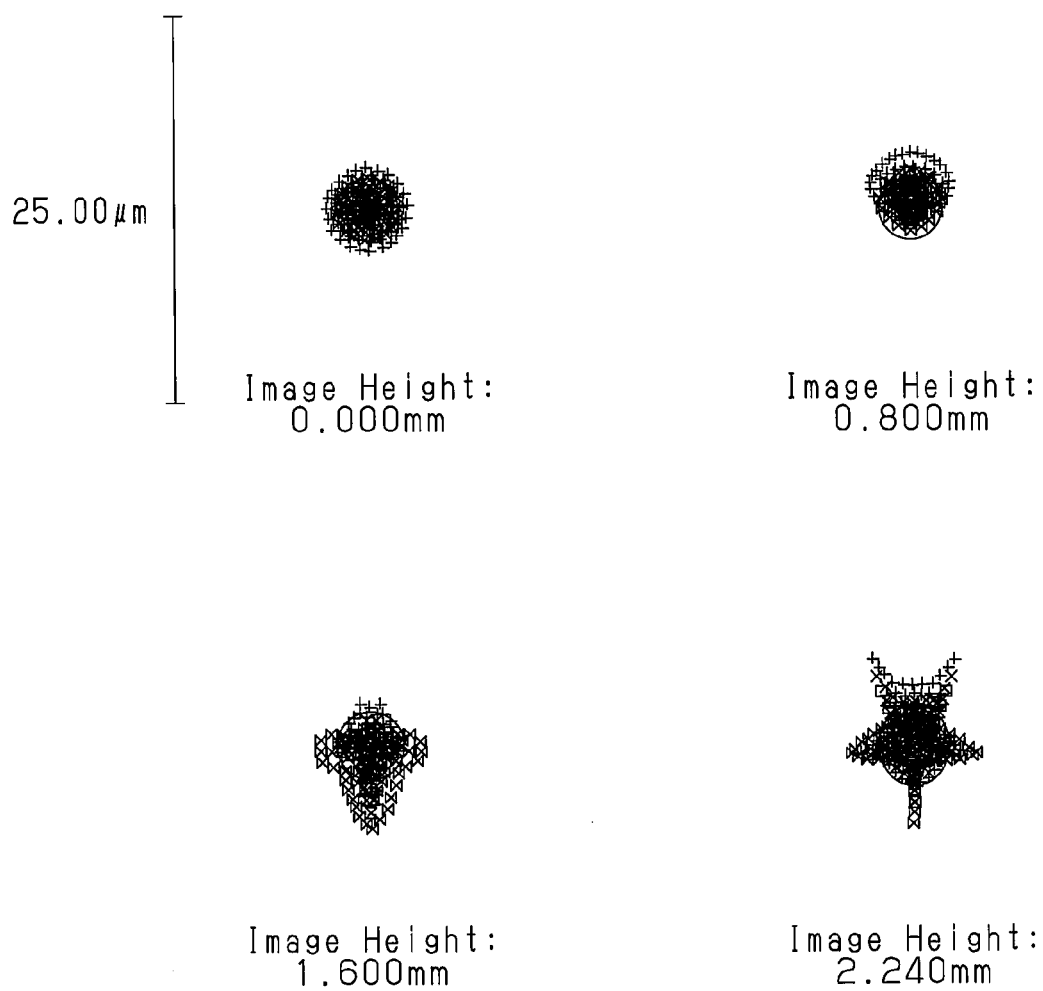
FIG. 15 is a spot diagram showing one of the characteristics of the lens unit in example 3.
Figure 17:
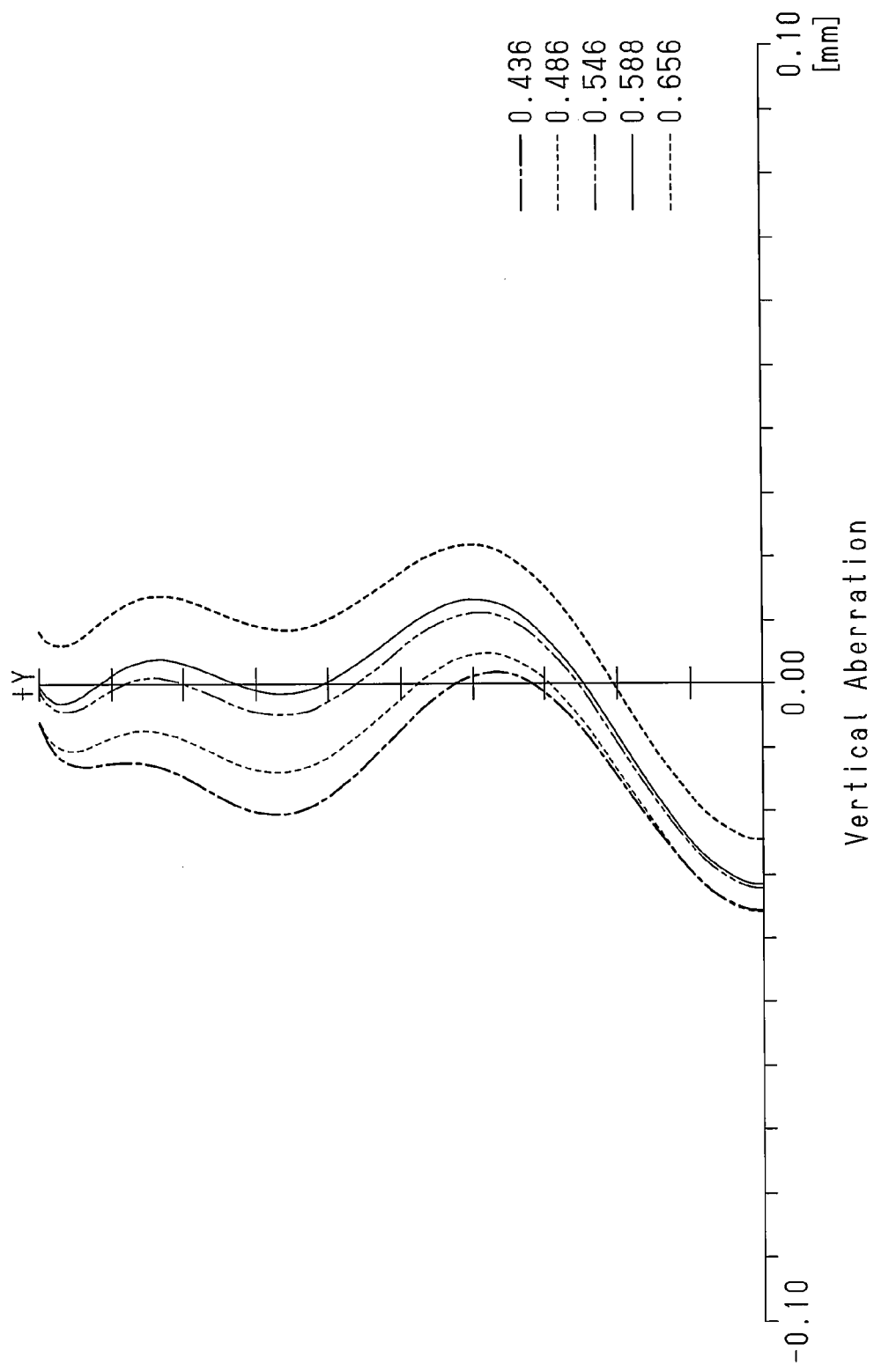
FIG. 17 is a graph showing the vertical aberration, which represents one of the characteristics of the lens unit in example 3.
Figure 18:
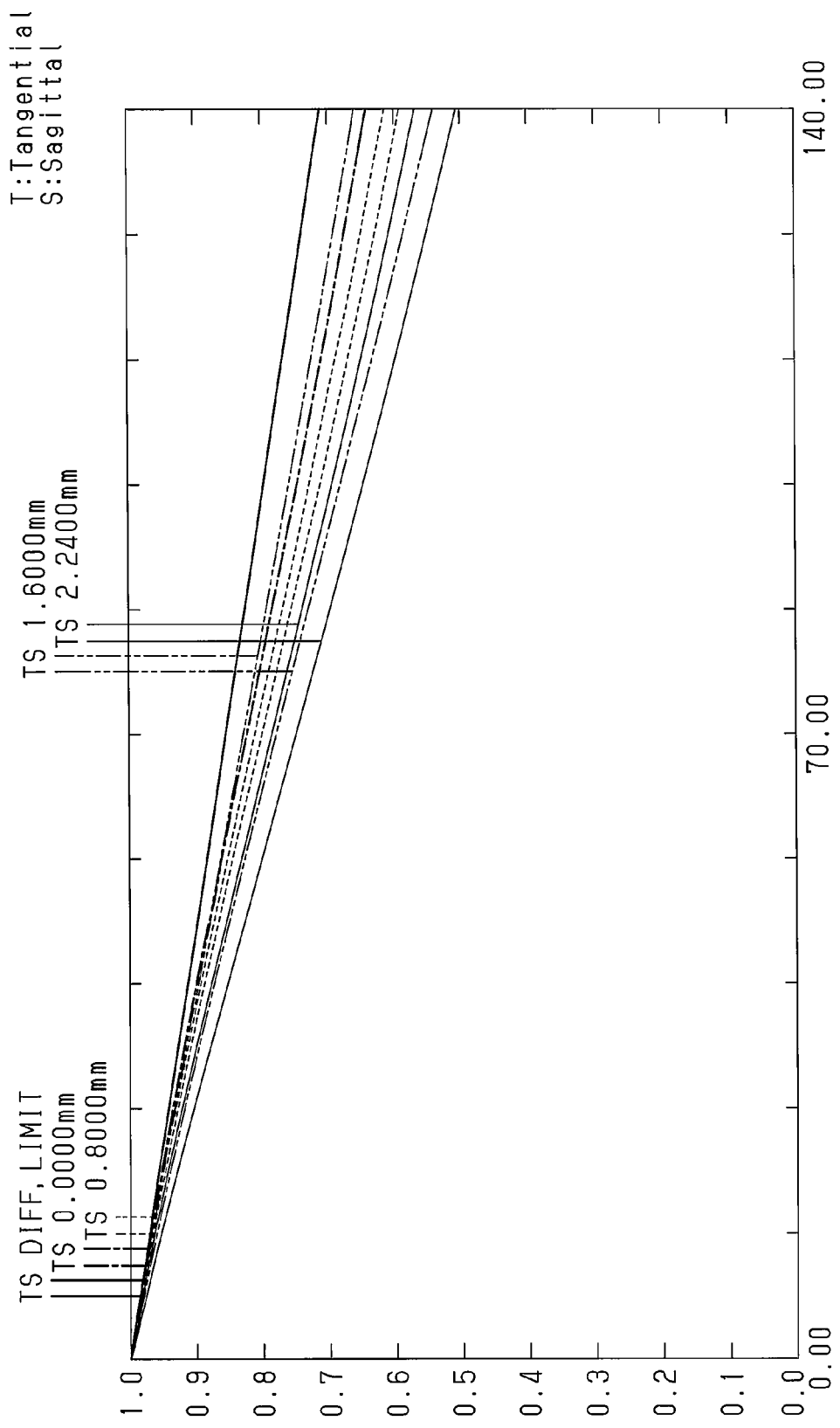
FIG. 18 is a graph showing the transfer function (MTF), which represents one of the characteristics of the lens unit in example 3.

In the second embodiment, referring to FIG. 14, the lens unit 10 applied to the mobile phone includes, in order of arrangement from the object side toward the image side, the first lens 1, the aperture stop 5, the second lens 2, the third lens 3, the fourth lens 4, and the cover glass 6. Accordingly, in the second embodiment, the lens unit 10 is of a middle stop type like the first embodiment.

The object side surface 11 (first surface) of the first lens 1 is convex at the object side, and the image side surface 12 (second surface) of the first lens 1 is convex at the image side. The object side surface 21 (fourth surface) of the first lens 1 is a lens having positive power (hereinafter simply referred to as a "positive lens"). Further, the object side surface 21 (fourth surface) of the second lens 2 is convex at the object side, and the image side surface 22 (fifth surface) of the second lens is concave at the image side. The second lens 2 is a lens having negative power (hereinafter simply referred to as a "negative lens") and is a lens having a meniscal shape (hereinafter simply referred to as a meniscus lens).

The aperture stop 5 is arranged between the first and second lenses 1 and 2 in contact with the image side surface 12 of the first lens 1. As described above, the image side surface 12 (second surface) of the first lens 1 is convex at the image side. Thus, the surface (third surface) of the aperture stop 5 is located further toward the object side from a surface peak 12*t* in the image side surface 12 (second surface) of the first lens 1. Accordingly, in comparison with the lens unit of the first embodiment (described later as example 1), the aperture stop 5 is located further toward the image side from the surface peak 12*t* in the image side surface 12 of the first lens 1, the first lens 1 may be located closer to the aperture stop 5. This allows for the entire length of the lens unit to be shortened. The remaining lens structure is the same as the first embodiment and thus will not be described.

In addition to the advantages of the first embodiment, the second embodiment has the advantage described below.

(5) The aperture stop 5 is located further toward the object side from the surface peak 12*t* in the image side surface 12 (second surface) of the first lens 1. Thus, in comparison with when the aperture stop 5 is located further toward the image side than the image side surface 12 of the first lens 1, the first lens 1 may be located closer to the aperture stop 5. This allows for the entire length of the lens unit to be shortened.

Third Embodiment

A third embodiment of an imaging capturing device according to the present invention and applied to a mobile phone will now be discussed with reference to the drawings. The third embodiment differs from the first and second embodiments only in the structure of the fourth lens. Thus, parts that are the same as the first embodiment will not be described in detail.

Figure 19:
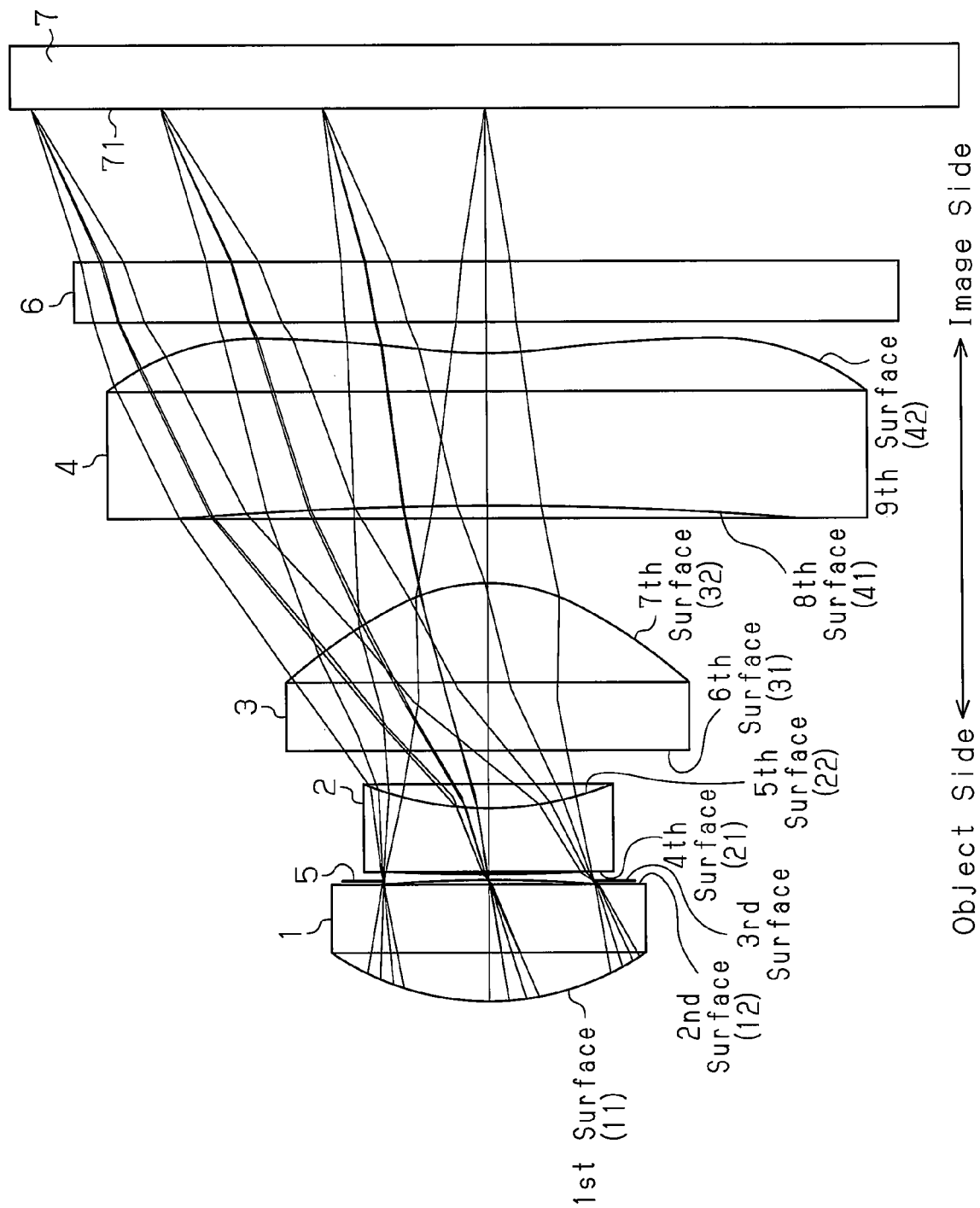
FIG. 19 is a schematic cross-sectional view showing a third embodiment of a lens unit in example 4 taken along a plane which includes the optical axis of the lens unit.
Figure 20:
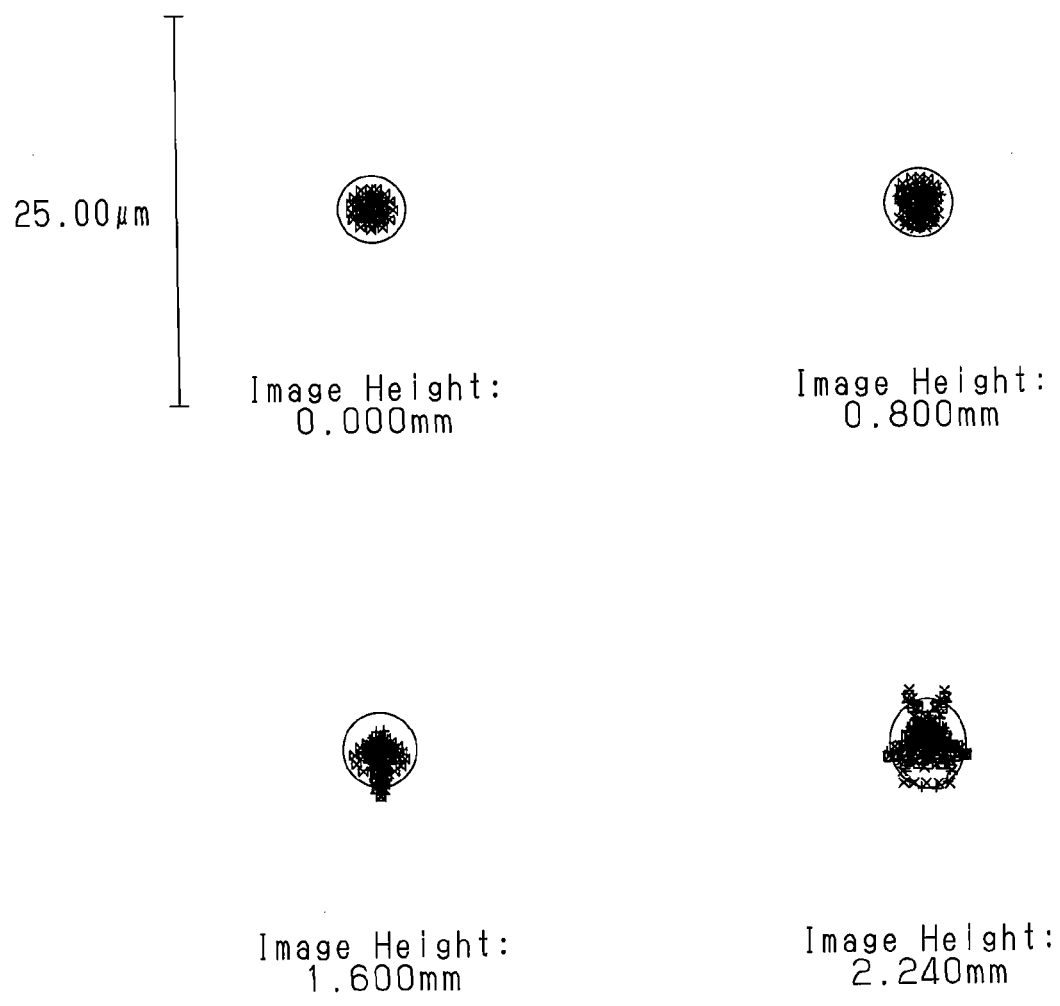
FIG. 20 is a spot diagram showing one of the characteristics of the lens unit in example 4.
Figure 21:
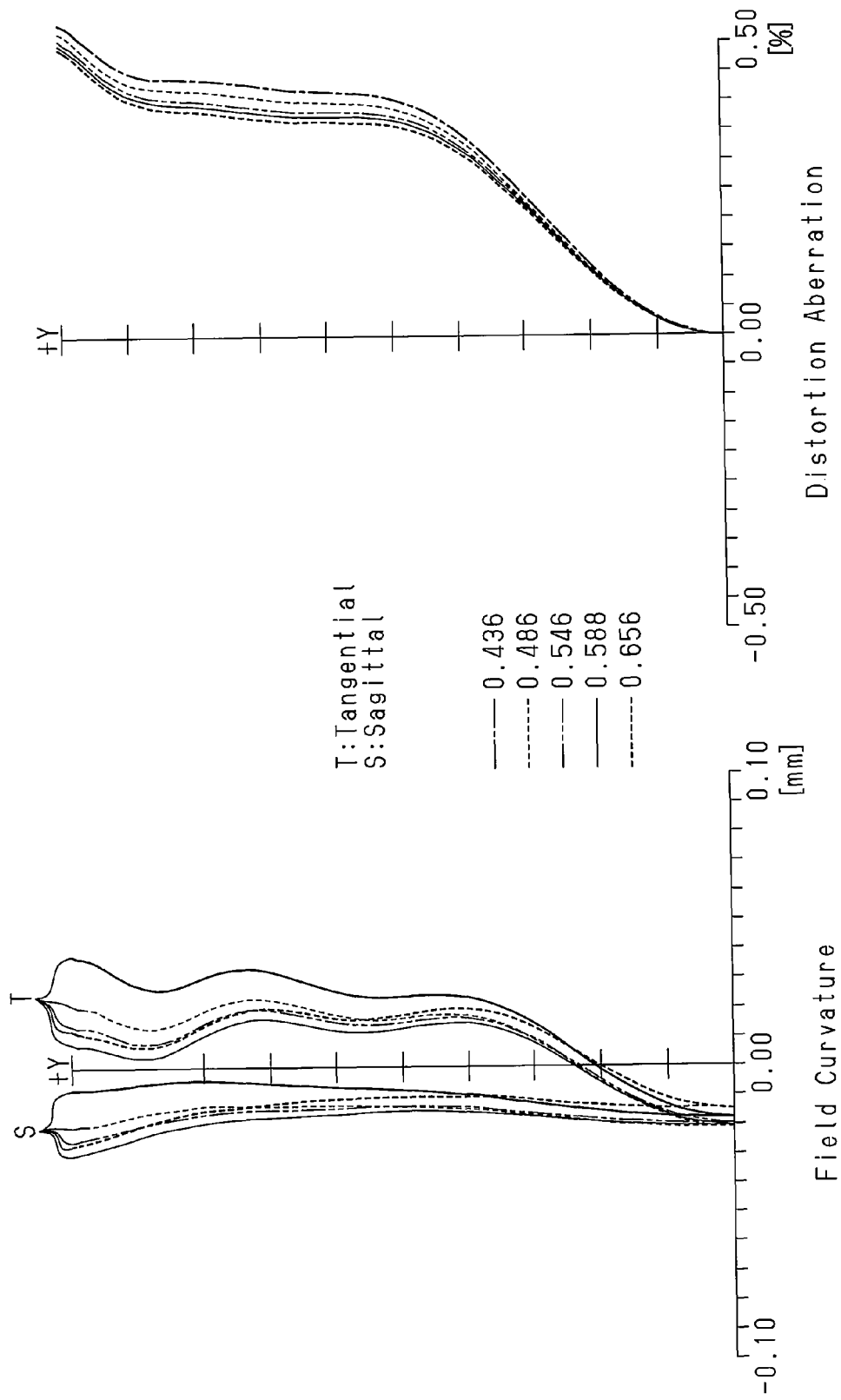
FIG. 21 includes graphs each showing one of the characteristics of the lens unit in example 4.
Figure 22:
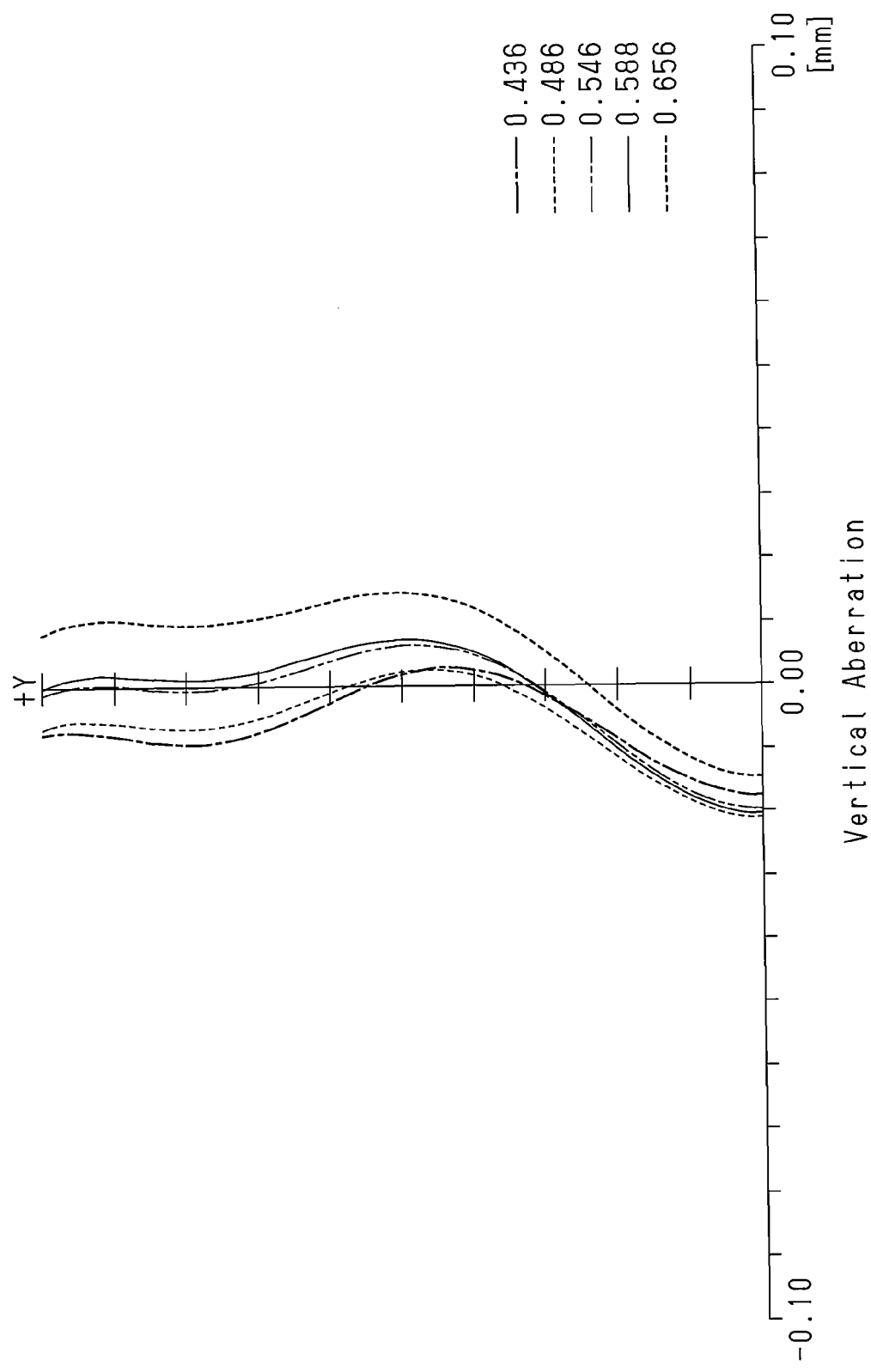
FIG. 22 is a graph showing the vertical aberration, which represents one of the characteristics of the lens unit in example 4.
Figure 23:
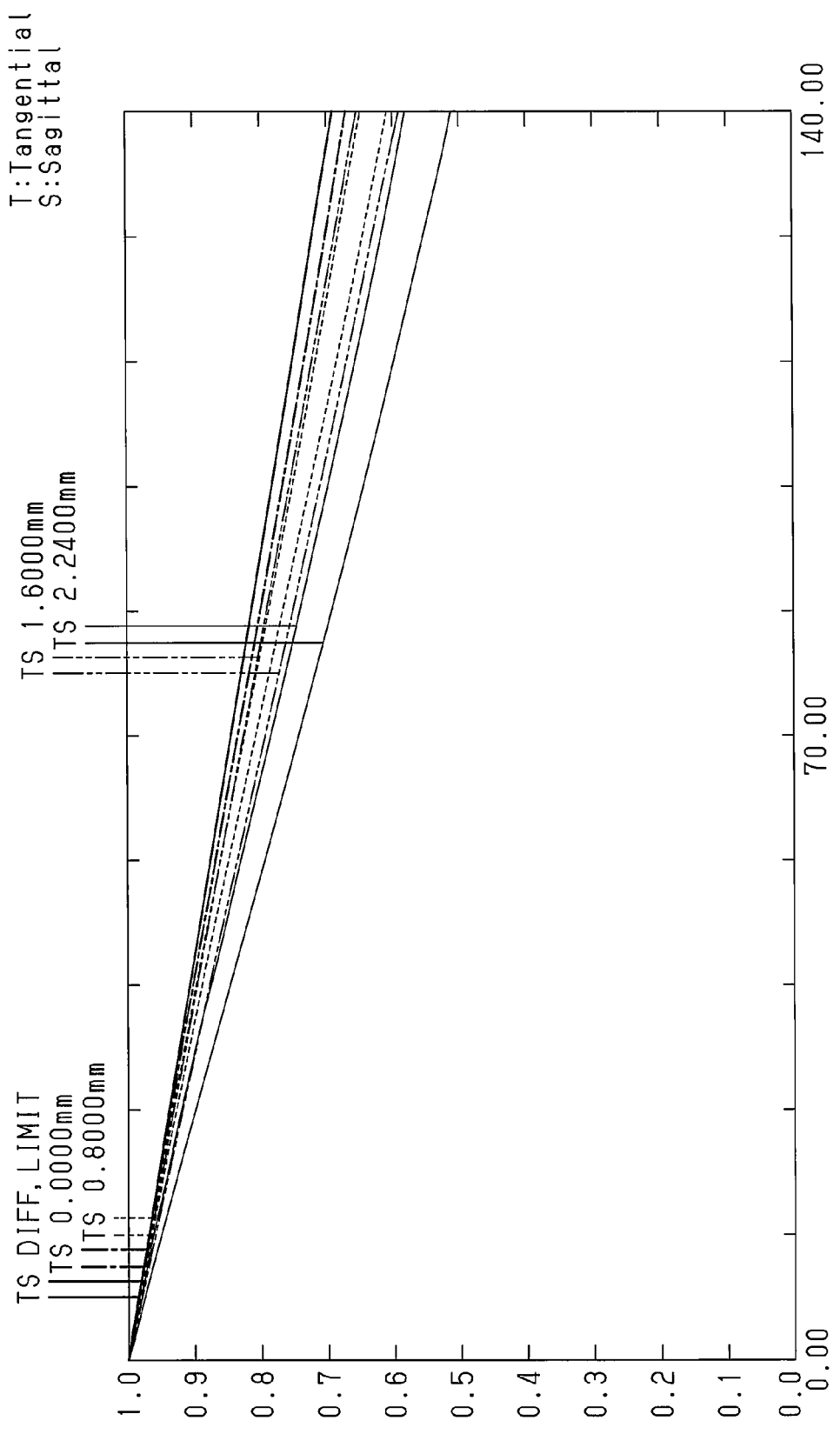
FIG. 23 is a graph showing the transfer function (MTF), which represents one of the characteristics of the lens unit in example 4.

In the third embodiment, referring to FIG. 19, the lens unit 10 applied to the mobile phone includes, in order of arrangement from the object side toward the image side, the first lens 1, the aperture stop 5, the second lens 2, the third lens 3, the fourth lens 4, and the cover glass 6. Accordingly, in the third embodiment, the lens unit 10 is of a middle stop type like the first embodiment.

The image side surface 42 and object side surface 41 of the fourth lens 4 are each aspherical and include at least one inflection point. The features of the third embodiment is in the object side surface 41 of the fourth lens 4, which has a central portion convex at the object side and a peripheral portion concave at the object side.

More specifically, the object side surface 41 (eighth surface) includes an inflection point and has a curvature that decreases from the central portion, which is convex at the object side, toward the peripheral portion so as to become convex. Thus, in comparison with when the peripheral portion in the object side surface of the fourth lens 4 is convex at the object side, the lens edge of the fourth lens 4 may be arranged closer to the third lens 3. This collects and refracts more light that has passed through the third lens 3. In the third embodiment, the image height is greater than the diameter of the lens 4. Thus, the lens unit is configured so that the light that has passed through the fourth lens 4, which is an image side lens, is diffused to the image height to form an image. Accordingly, in comparison to the first embodiment and the second embodiment, which refract the light that has passed through the third lens 3 at a location further toward the image side, the third embodiment refracts the light that has passed through the third lens 3 at a location further toward the object side and thereby allows for more distance to be provided from the imaging plane 71 and a smaller diameter for the fourth lens 4.

In addition to the advantages of the first and second embodiments, the third embodiment has the advantage described below.

(6) The peripheral portion in the object side surface 41 (eighth surface) of the fourth lens 4 is concave at the object side. Thus, in comparison to when the peripheral portion in the object side surface of the fourth lens 4 is convex at the object side, the lens edge of the fourth lens 4 may be arranged closer to the third lens 3. Accordingly, the light that has passed through the third lens 3 may be refracted at a location further toward the object side. In the lens unit of the third embodiment, the image height is greater than the diameter of the lens 4. Thus, the lens unit is configured so that the lens located at the image side, namely, the fourth lens 4, diffuses the light to the image height to form an image. In this case, the use of the lens 4, which refracts more light that has passed through the third lens 3, allows for more distance to be provided from the imaging plane 71. This enables the fourth lens 4 to have a smaller diameter than a lens that refracts the light that has passed through the third lens 3 at a location further toward the image side.

Fourth Embodiment

A fourth embodiment of an imaging capturing device according to the present invention and applied to a mobile phone will now be discussed with reference to the drawings. The fourth embodiment differs from the first, second, and third embodiments only in the structure of the second lens. Thus, parts that are the same as the first embodiment will not be described in detail.

Figure 24:
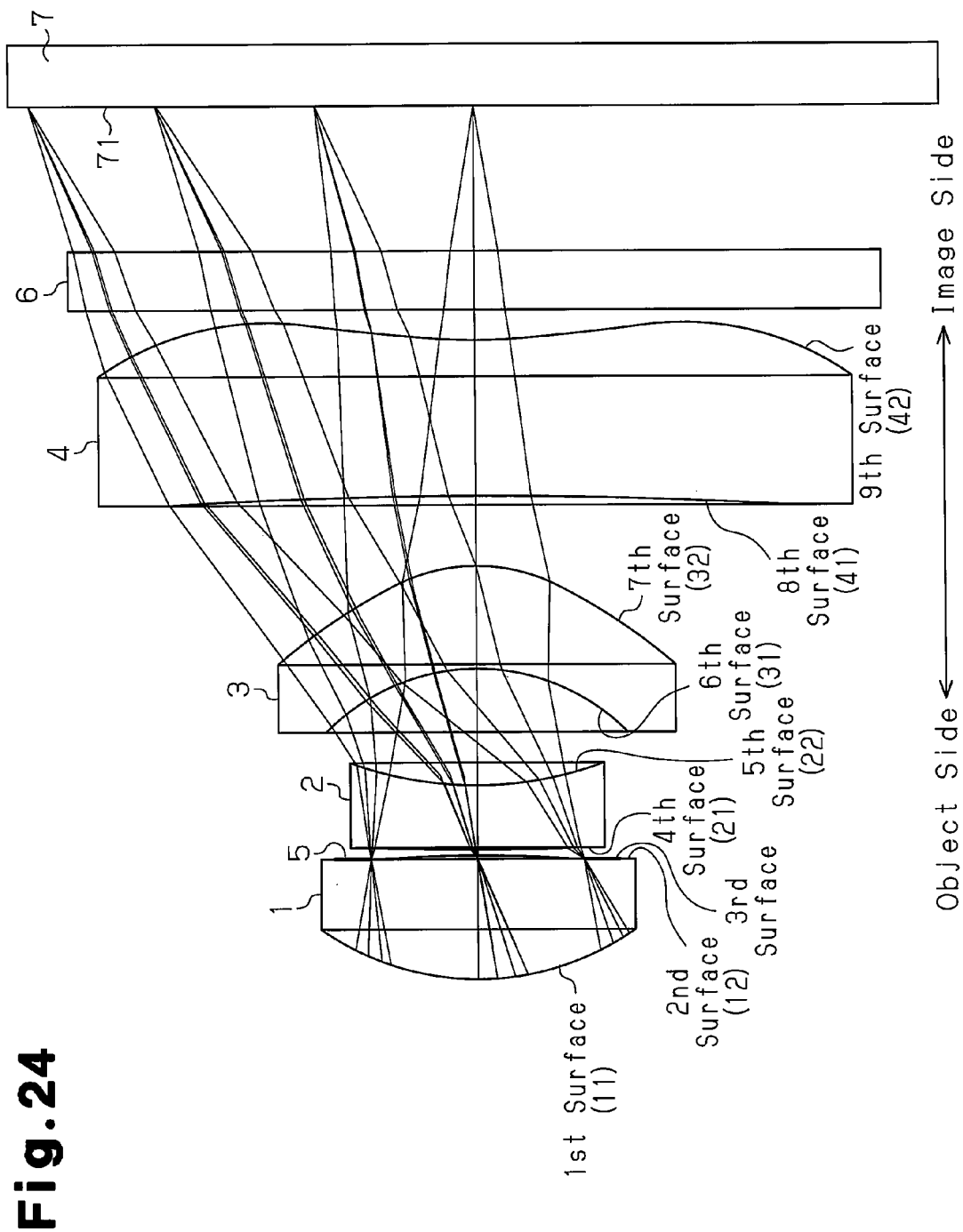
FIG. 24 is a schematic cross-sectional view showing a fourth embodiment of a lens unit in example 5 taken along a plane which includes the optical axis of the lens unit.
Figure 25:
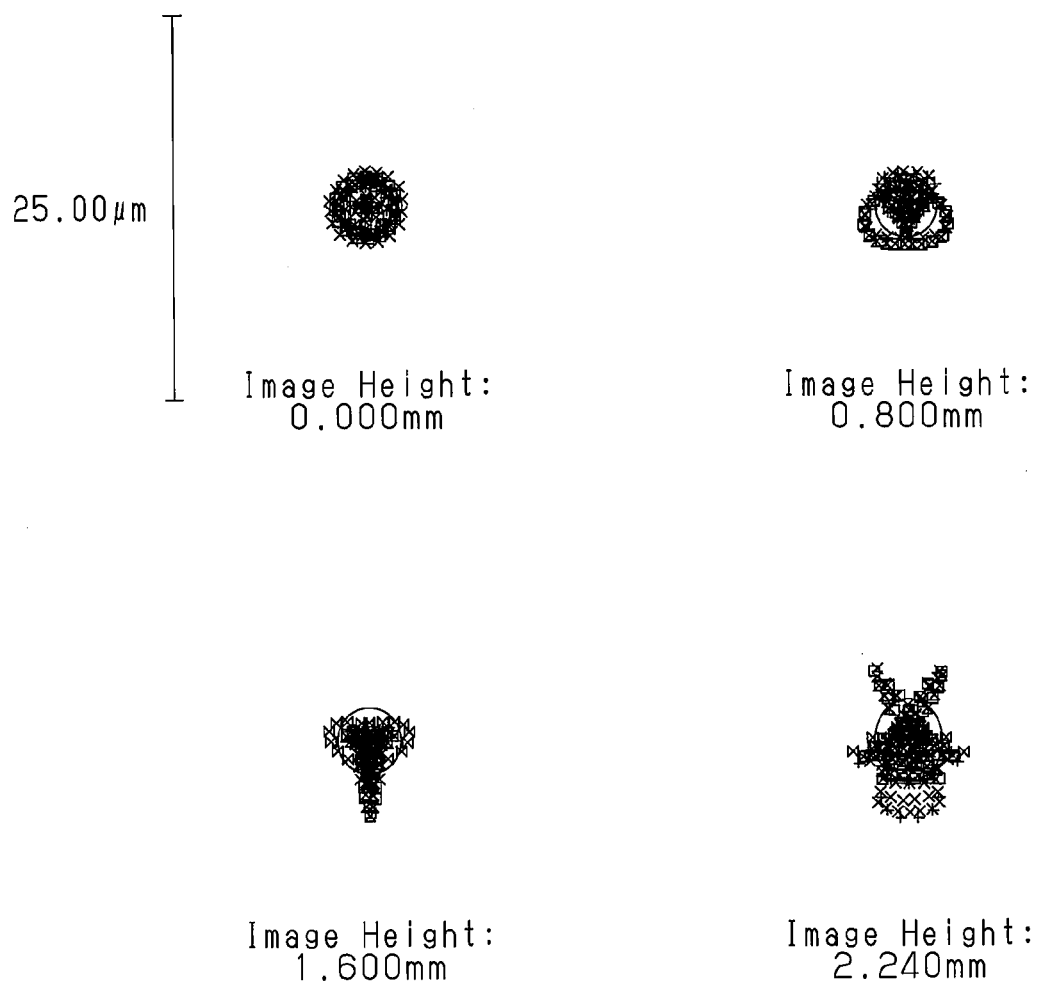
FIG. 25 is a spot diagram showing one of the characteristics of the lens unit in example 5.
Figure 26:
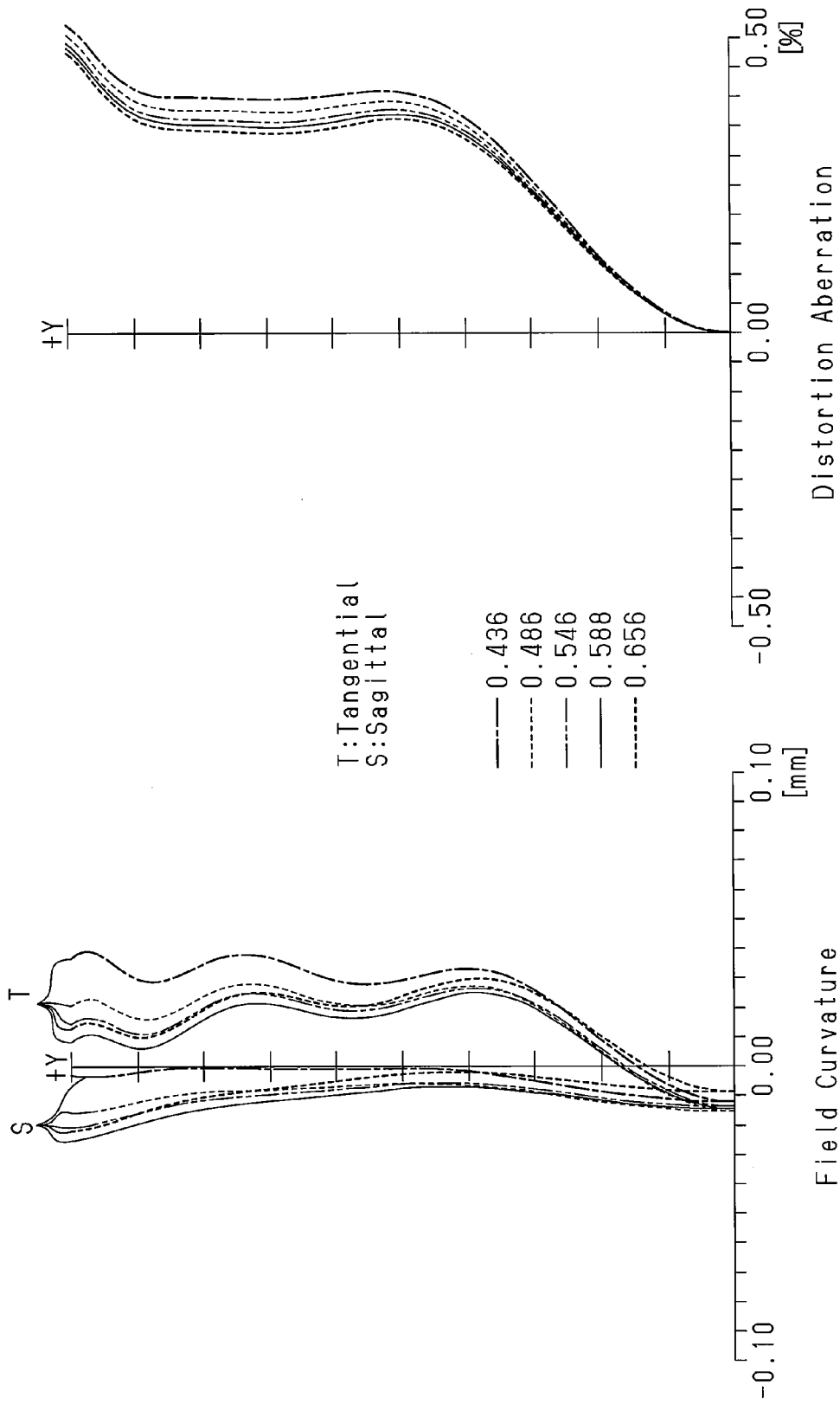
FIG. 26 includes graphs each showing one of the characteristics of the lens unit in example 5.
Figure 27:
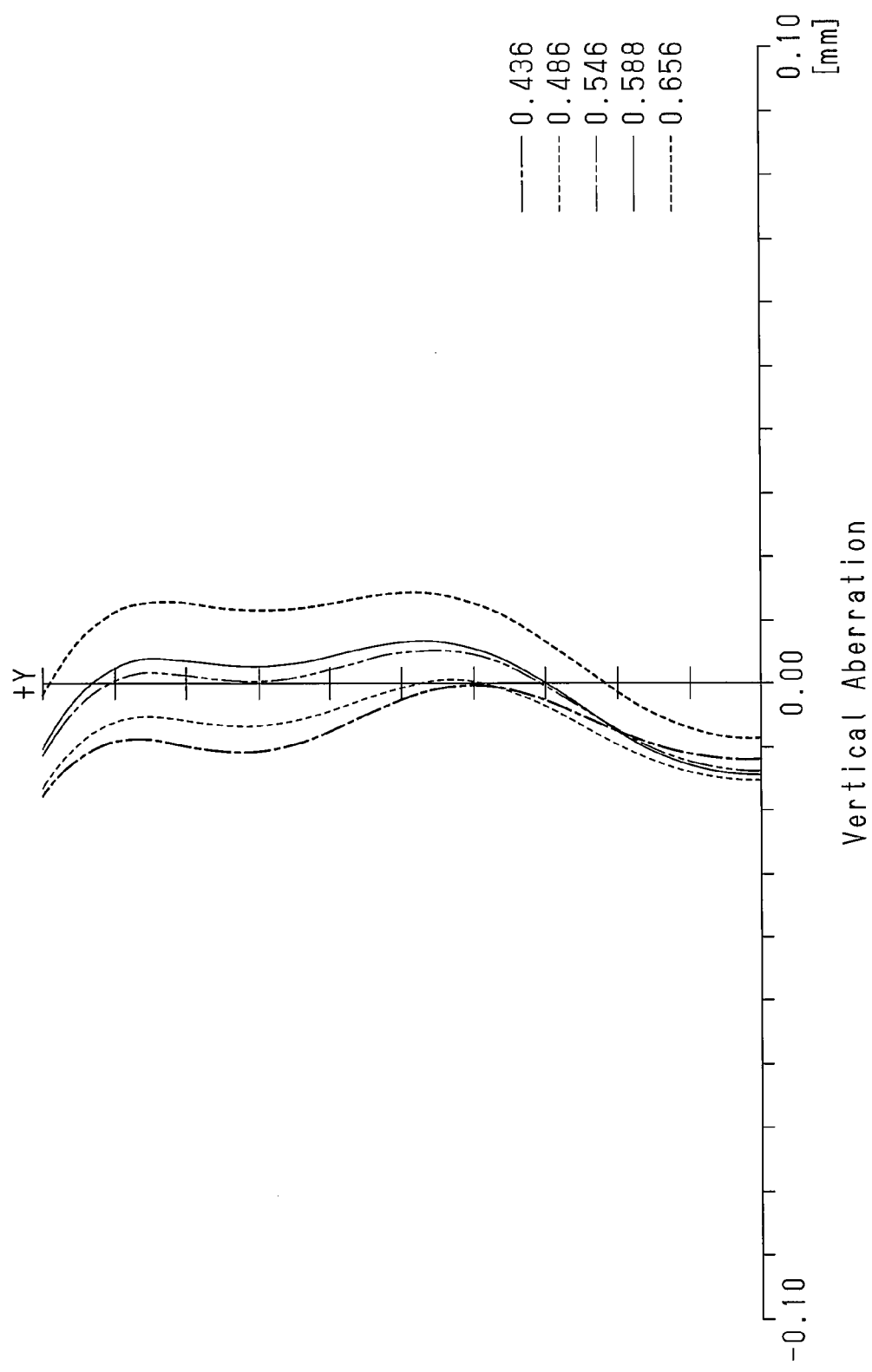
FIG. 27 is a graph showing the vertical aberration, which represents one of the characteristics of the lens unit in example 5.
Figure 28:
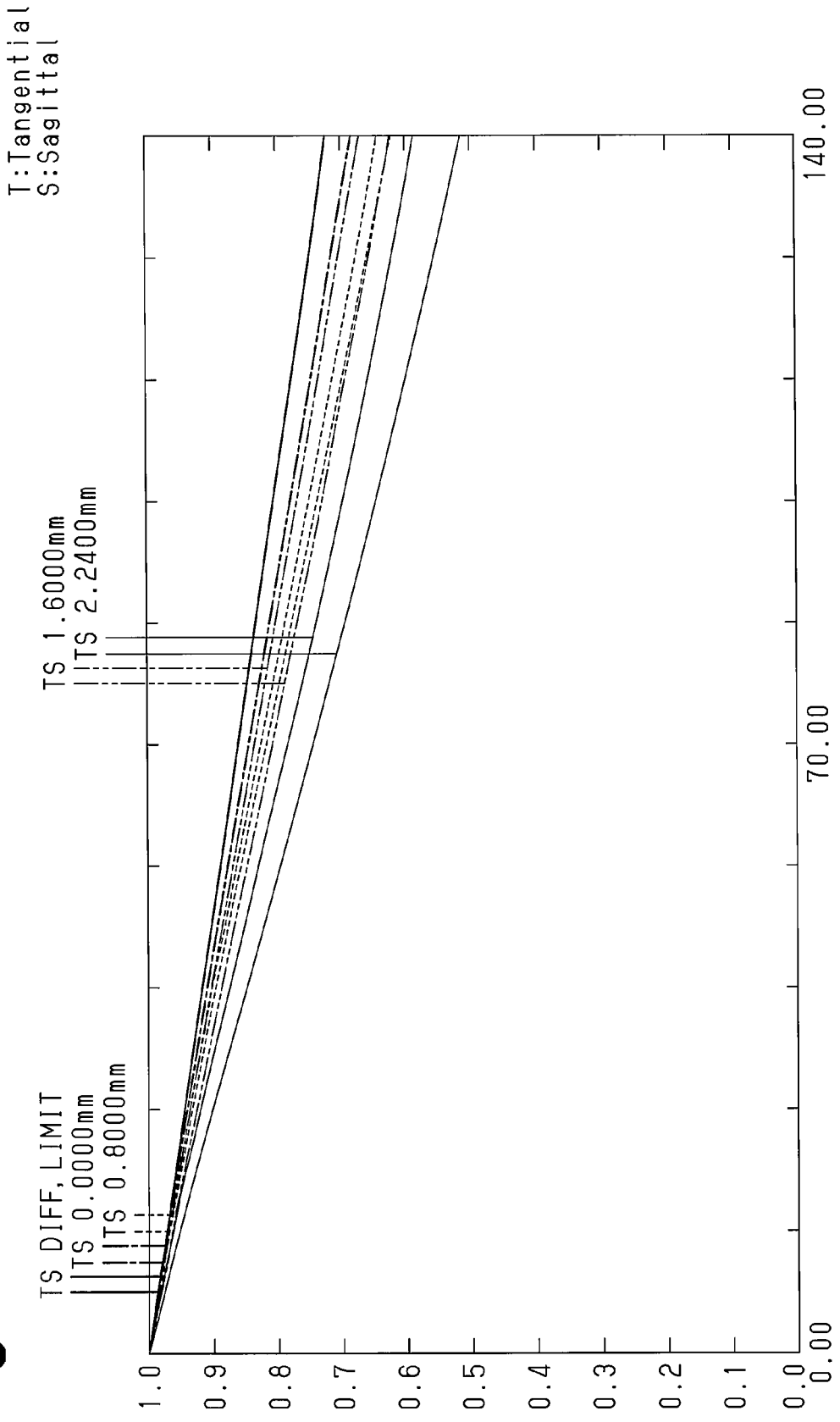
FIG. 28 is a graph showing the transfer function (MTF), which represents one of the characteristics of the lens unit in example 5.

In the fourth embodiment, referring to FIG. 24, the lens unit 10 applied to the mobile phone includes, in order of arrangement from the object side toward the image side, the first lens 1, the aperture stop 5, the second lens 2, the third lens 3, the fourth lens 4, and the cover glass 6. Accordingly, in the fourth embodiment, the lens unit 10 is of a middle stop type like the first embodiment.

The features of the fourth embodiment is in that the object side surface 21 of the second lens 2, which has a central portion concave at the object side and a peripheral portion convex at the object side. The use of the second lens 2 allows for proper corrections of aberrations in the light that has passed through the first lens. Further, the peripheral portion is convex at the object side. This allows for cancellation of changes in the optical path caused by deformation of the first lens 1 and the second lens 2 when the temperature changes.

In addition to the advantages of the first, second, and third embodiments, the third embodiment has the advantage described below.

(7) The object side surface 21 (fourth surface) of the second lens 2, which has a central portion concave at the object side and a peripheral portion convex at the object side. This allows for proper corrections of aberrations in the light that has passed through the first lens. Further, the peripheral portion is convex at the object side. This allows for cancellation of changes in the optical path caused by deformation of the first lens 1 and the second lens 2 when the temperature changes.

Example 1

Referring to FIG. 3, in the lens unit of example 1, the image side surface 12 of the first lens 1 is convex at the image side, and the object side surface 21 of the second lens 2 is convex at the object side. In other words, the opposing lens of the first and second lenses 1 and 2 sandwiching the aperture stop 5 are both convex. Accordingly, example 1 corresponds to the lens unit in the first embodiment. The design conditions of the lens unit are shown below.

Focal length of entire system: 3.908 mm
F-number: 2.8
Entire lens length: 4.40 mm
Back focus: 1.03 mm
Effective image height: Φ4.5 mm The lens data is shown in table 1. In table 1, a number i is allocated for each surface in order from the object side of the first lens 1, which serves as the first surface as shown in FIG. 3, toward the image side. Further, Ri represents the radius of curvature of each surface, Di represents the distance between the ith surface and the (i+1)th surface, nd represents the refractive index, and vd represents the Abbe number.

TABLE 1

| Surface No. | Ri | Di | Material | Radius |
|---|---|---|---|---|
| Object | ∞ | ∞ | | |
| 1* | 1.295 | 0.609 | APEL5514ML | 0.843 |

TABLE 1-continued

| Surface No. | Ri | Di | Material | Radius |
|---|---|---|---|---|
| 2* | −8.158 | 0.016 | | 0.648 |
| 3 (Stop) | ∞ | 0.054 | | 0.577 |
| 4* | 25.740 | 0.344 | OKP4HT | 0.622 |
| 5* | 1.866 | 0.598 | | 0.670 |
| 6* | −1.283 | 0.499 | APEL5514ML | 0.799 |
| 7* | −1.196 | 0.390 | | 1.059 |
| 8* | 4.610 | 0.743 | APEL5514ML | 1.735 |
| 9* | 2.224 | 0.130 | | 1.974 |
| 10 | ∞ | 0.300 | B270 | 2.037 |
| 11 | ∞ | 0.721 | | 2.088 |
| 12 | ∞ | 0.000 | | 2.250 |
| Image | ∞ | — | | |

In table 1, APEL5514ML, which is a plastic lens material manufactured by Mitsui Chemicals, Inc., has a refractive index nd of 1.544 and an Abbe number vd of 56.0. Further, OKP4HT, which is a plastic lens material manufactured by Osaka Gas Chemicals Co., Ltd, has a refractive index nd of 1.632 and an Abbe number vd of 23.4. In addition, B270, which is a glass plate manufactured by Schott, has a refractive index nd of 1.523 and an Abbe number vd of 58.6.

The equation shown below represents an aspherical shape.

$$z = \frac{(1/R)H^2}{1+\sqrt{\{1-(1+K)(H/R)^2\}}} + A4H^4 + A6H^6 + A8H^8 + A10H^{10} + A12H^{12} + A14H^{14} + A16H^{16} \qquad (1)$$

In equation (1), the z axis represents the optical direction, R represents the radius of curvature, H represents the height in a direction perpendicular to the optical axis, and K represents the Korenich constant. Further, A4, A6, A8, A10, A12, A14, and A16 respectively represent the aspherical surface coefficients for the fourth order, sixth order, eighth order, tenth order, twelfth order, fourteenth order, and sixteenth order.

The aspherical surface coefficient for each surface is as shown below in Table 2.

TABLE 2

| Ri | K | A4 | A6 | A8 | A10 | A12 | A14 | A16 |
|---|---|---|---|---|---|---|---|---|
| 1st Surface | −1.040E−01 | −1.958E−02 | 2.033E−01 | −6.882E−01 | 1.102E+00 | −7.143E−01 | −3.083E−02 | |
| 3rd Surface | −1.060E+02 | 2.181E−01 | −6.086E−01 | 1.116E+00 | −1.800E+00 | 1.122E+00 | | |
| 4th Surface | 1.368E+03 | 2.779E−01 | −8.670E−01 | 1.453E+00 | −1.184E−01 | −7.338E+00 | 1.053E+01 | |
| 5th Surface | 8.560E−01 | 1.521E−01 | −3.852E−01 | 1.314E+00 | −2.070E+00 | 2.268E−01 | 2.445E+00 | |
| 6th Surface | −5.248E−02 | −4.490E−03 | 9.555E−03 | −1.074E+00 | 3.115E+00 | −3.377E+00 | 1.834E+00 | −1.316E+00 |
| 7th Surface | −3.369E−01 | −1.987E−02 | 2.386E−01 | −5.965E−01 | 7.511E−01 | −3.120E−01 | −2.968E−02 | 2.493E−02 |
| 8th Surface | 1.460E−01 | −1.229E−01 | 6.370E−02 | −1.481E−02 | 1.063E−03 | 1.158E−04 | −5.274E−06 | −4.299E−06 |
| 9th Surface | −3.108E−01 | −1.688E−01 | 6.336E−02 | −2.073E−02 | 4.016E−03 | −3.432E−04 | 3.625E−07 | 2.284E−08 |

The optical characteristics of the lens unit, more specifically, the spot diaphragm, field curvature, distortion aberration, vertical aberration, and MTF curves are respectively shown in FIGS. 5, 6A, 6B, 7, and 8.

Example 2

Figure 9:
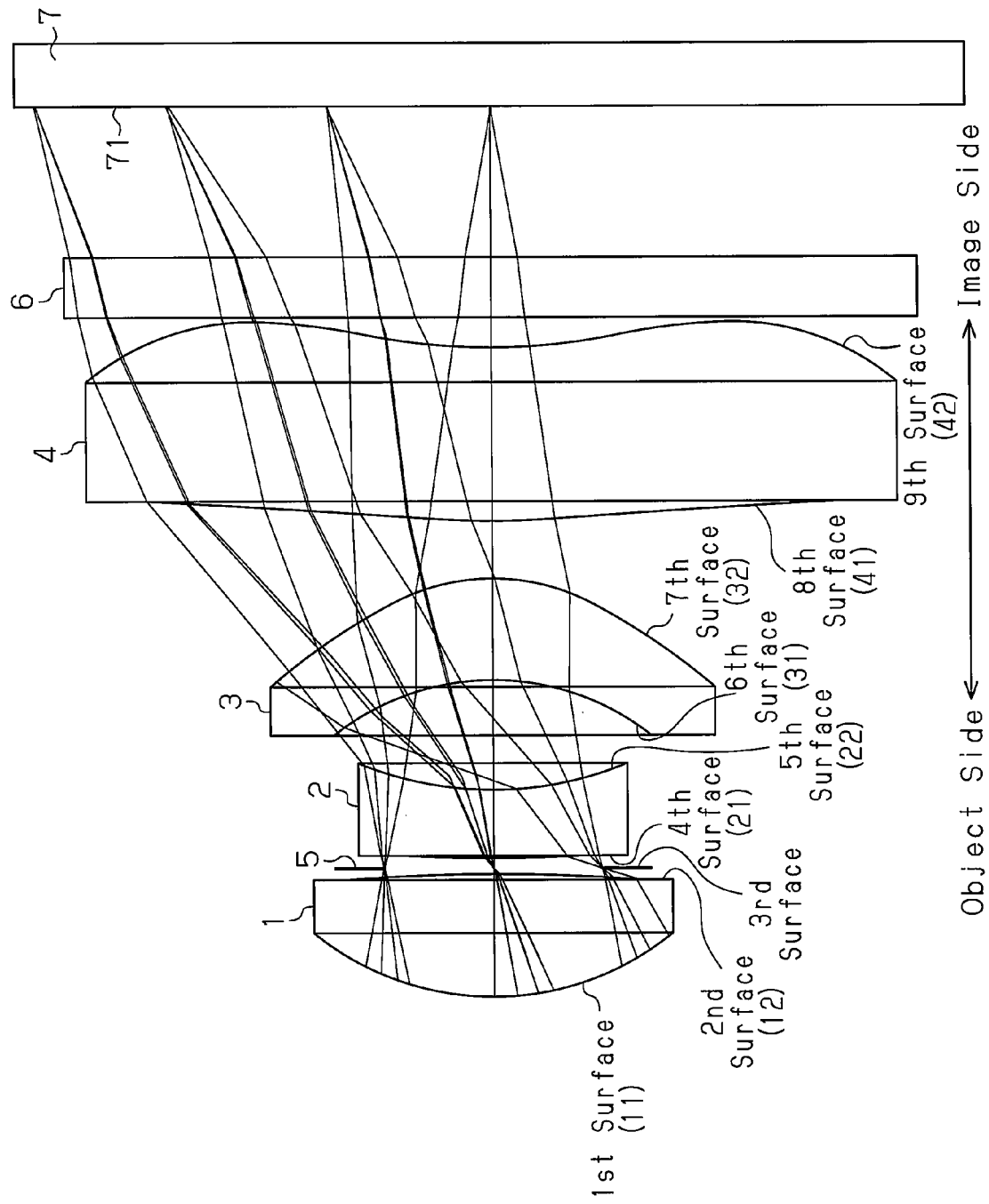
FIG. 9 is a schematic cross-sectional view showing a lens unit in example 2 taken along a plane which includes the optical axis of the lens unit.
Figure 10:
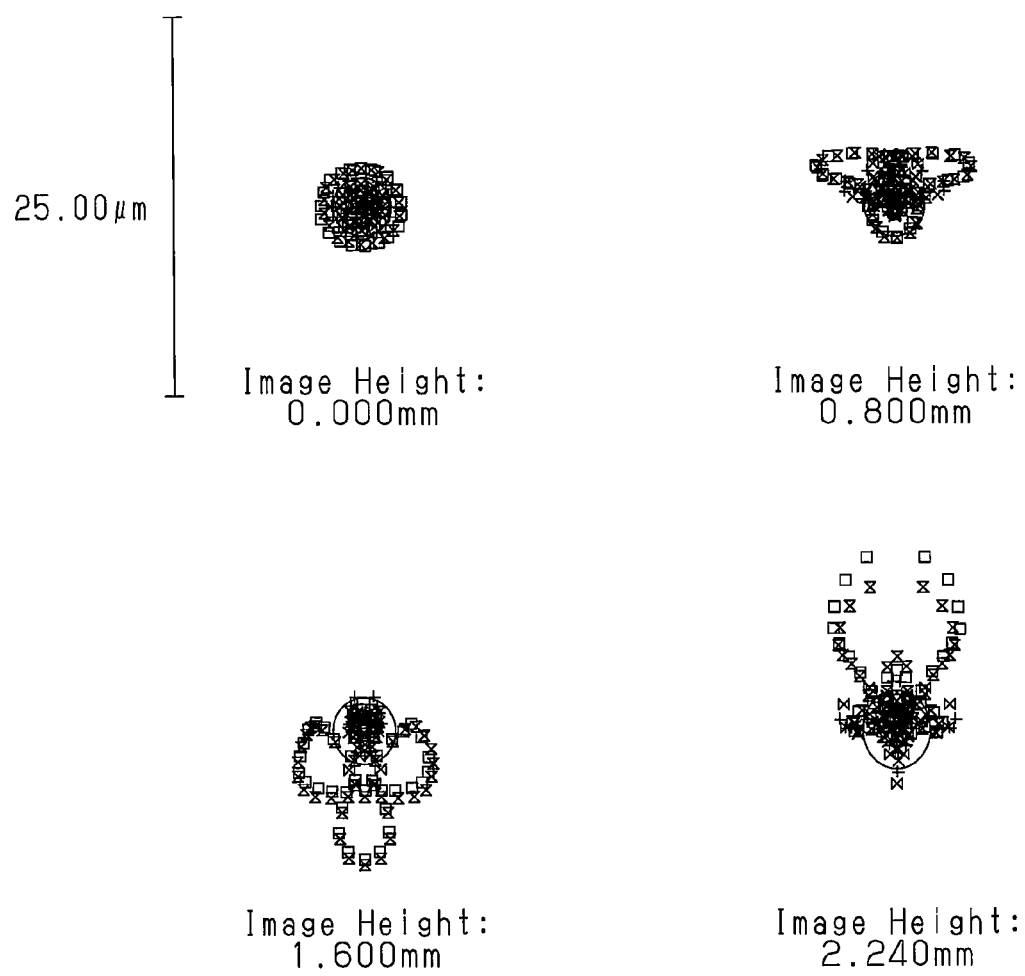
FIG. 10 is a spot diagram showing one of the characteristics of a lens unit in example 2.
Figures 11A, 11B:
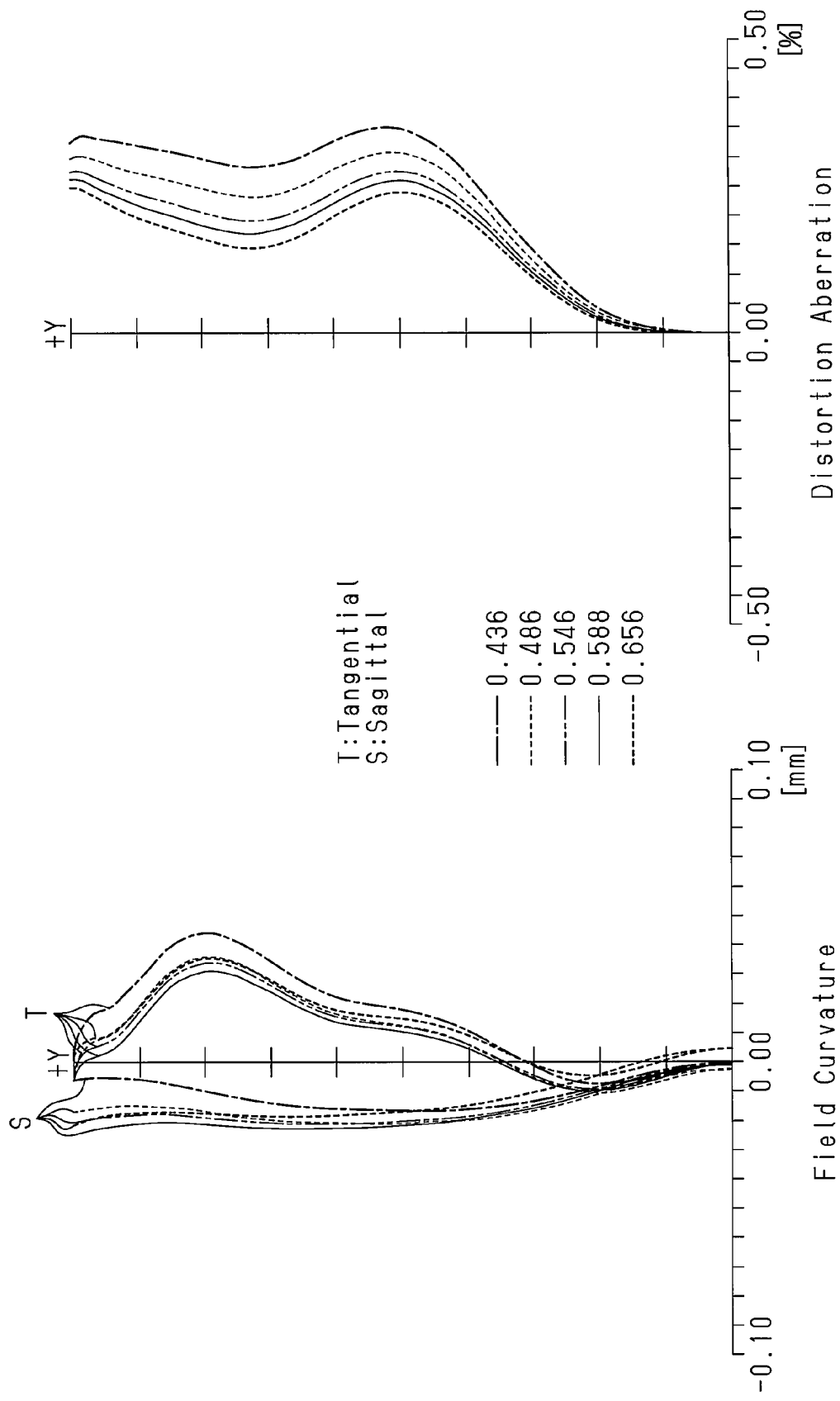
FIG. 11A is a graph showing the field curvature.
FIG. 11B is a graph showing the distortion aberration.
Figure 12:
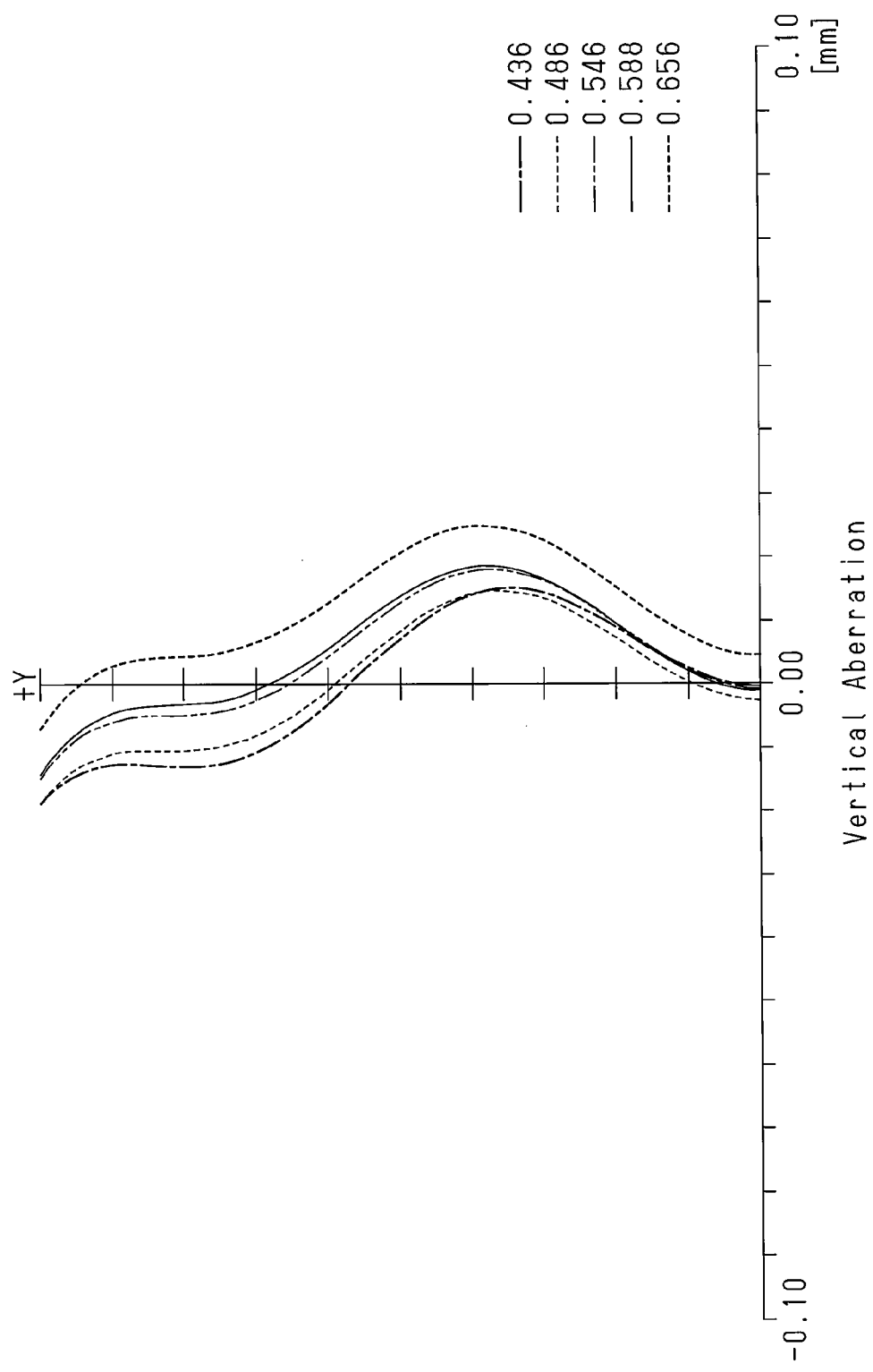
FIG. 12 is a graph showing the vertical aberration, which represents one of the characteristics of the lens unit in example 2.

Referring to FIG. 9, in the lens unit of example 2, the image side surface 12 of the first lens 1 is convex at the image side, and the object side surface 21 of the second lens 2 is convex at the object side. In other words, the opposing lens of the first and second lenses 1 and 2 sandwiching the aperture stop 5 are both convex. Accordingly, example 2 corresponds to the lens unit in the first embodiment. The design conditions of the lens unit are shown below.

Figure 13:
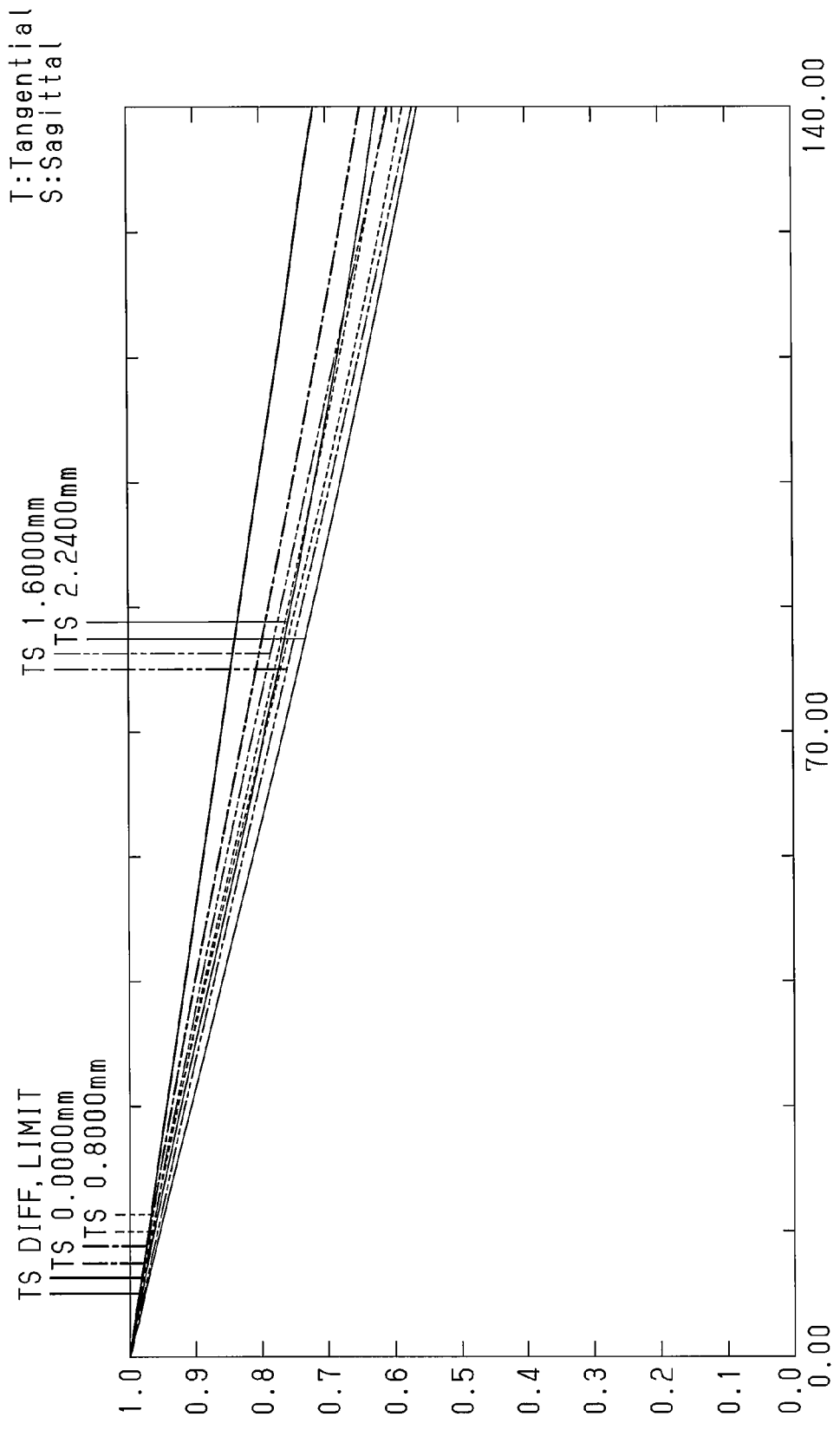
FIG. 13 is a graph showing the transfer function (MTF), which represents one of the characteristics of the lens unit in example 2.

Focal length of entire system: 3.629 mm
F-number: 2.8
Entire lens length: 4.40 mm
Back focus: 1.19 mm
Effective image height: Φ4.5 mm The lens data is shown in table 3. In table 3, a number i is allocated for each surface in order from the object side surface of the first lens 1, which serves as the first surface as shown in FIG. 13, toward the image side. Further, the parameters of Ri, Di, nd, and vd are the same as those of table 1.

TABLE 3

| Surface No. | Ri | Di | Material | Radius |
|---|---|---|---|---|
| Object | ∞ | ∞ | | |
| 1* | 1.339 | 6.05E−01 | E48R | 0.888 |
| 2* | −7.388 | 3.08E−02 | | 0.729 |
| 3 (Stop) | ∞ | 4.94E−02 | | 0.537 |
| 4* | 26.543 | 3.40E−01 | OKP4HT | 0.582 |
| 5* | 1.916 | 5.40E−01 | | 0.661 |
| 6* | −1.255 | 5.03E−01 | E48R | 0.791 |
| 7* | −1.077 | 2.90E−01 | | 1.099 |
| 8* | 4.015 | 8.55E−01 | E48R | 1.735 |
| 9* | 2.165 | 1.50E−01 | | 1.997 |
| 10 | ∞ | 3.00E−01 | B270 | 2.062 |
| 11 | ∞ | 7.40E−01 | | 2.104 |
| 12 | ∞ | 0.00E+00 | | 2.250 |
| Image | ∞ | — | | |

In table 3, E48R, which is a plastic lens material manufactured by Zeon Corporation, has a refractive index nd of 1.531 and an Abbe number vd of 56.0. Further, OKP4HT and B270 are the same as table 1.

The aspherical surface coefficient for each surface derived using equation (1) is as shown in table 4.

TABLE 4

| Ri | K | A4 | A6 | A8 | A10 | A12 | A14 | A16 |
|---|---|---|---|---|---|---|---|---|
| 1st Surface | −2.288E−03 | −1.562E−02 | 2.193E−01 | −7.145E−01 | 1.172E+00 | −7.265E−01 | −1.436E−01 | |
| 3rd Surface | −1.156E+02 | 2.409E−01 | −5.851E−01 | 6.433E−01 | −8.534E−01 | 2.724E−01 | | |
| 4th Surface | 1.221E+03 | 2.706E−01 | −7.918E−01 | 6.698E−01 | −5.773E−01 | −3.313E−02 | 2.647E−01 | |
| 5th Surface | 7.574E−01 | 1.496E−01 | −4.755E−01 | 1.393E+00 | −2.924E+00 | 2.479E+00 | 2.802E−01 | |
| 6th Surface | −2.040E−01 | 2.259E−02 | −8.026E−02 | −9.410E−01 | 3.497E+00 | −3.529E+00 | 9.428E−01 | −2.889E−01 |
| 7th Surface | −3.108E−01 | −5.401E−03 | 2.115E−01 | −5.852E−01 | 7.882E−01 | −2.837E−01 | −1.941E−02 | 9.046E−04 |
| 8th Surface | −8.900E−03 | −1.247E−01 | 6.430E−02 | −1.476E−02 | 9.806E−04 | 8.544E−05 | −5.578E−06 | −5.447E−07 |
| 9th Surface | −4.263E−02 | −1.725E−01 | 6.203E−02 | −2.072E−02 | 3.973E−03 | −3.517E−04 | −2.227E−07 | 5.002E−08 |

The optical characteristics of the lens unit, more specifically, the spot diaphragm, field curvature, distortion aberration, vertical aberration, and MTF curves are respectively shown in FIGS. 10, 11A, 11B, 12, and 13.

Example 3

Referring to FIG. 14, in the lens unit of example 3, the image side surface 12 of the first lens 1 is convex at the image side, and the object side surface 21 of the second lens 2 is convex at the object side. In other words, the opposing surfaces of the first and second lenses 1 and 2 sandwiching the aperture stop 5 are both convex. Further, the aperture stop 5 is arranged between the first and second lenses 1 and 2 in contact with the image side surface 12 of the first lens 1. In this case, the mage side surface 12 (second surface) of the first lens 1 is convex at the image side. Thus, the surface (third surface) of the aperture stop 5 is located further toward the object side from the surface peak 12t on the image side surface (second surface) of the first lens 1. Accordingly, example 3 corresponds to the lens unit in the second embodiment. The design conditions of the lens unit are shown below.

Focal length of entire system: 3.792 mm
F-number: 2.8
Entire lens length: 4.37 mm
Back focus: 1.15 mm
Effective image height: Φ4.5 mm The lens data is shown in table 5. In table 5, a number i is allocated for each surface in order from the object side surface of the first lens 1, which serves as the first surface as shown in FIG. 14, toward the image side. Further, the parameters of Ri, Di, nd, and vd are the same as those of table 1.

TABLE 5

| Surface No. | Ri | Di | Material | Radius |
|---|---|---|---|---|
| Object | ∞ | ∞ | | |
| 1* | 1.276 | 0.607 | E48R | 0.808 |
| 2* | −7.982 | −0.005 | | 0.601 |
| 3 (Stop) | ∞ | 0.071 | | 0.567 |
| 4* | 22.863 | 0.344 | OKP4HT | 0.617 |
| 5* | 1.936 | 0.523 | | 0.668 |
| 6* | −1.115 | 0.500 | E48R | 0.760 |
| 7* | −1.005 | 0.548 | | 0.997 |
| 8* | 7.940 | 0.633 | E48R | 1.735 |
| 9* | 2.448 | 0.150 | | 1.941 |
| 10 | ∞ | 0.300 | B270 | 2.019 |
| 11 | ∞ | 0.696 | | 2.073 |

TABLE 5-continued

| Surface No. | Ri | Di | Material | Radius |
|---|---|---|---|---|
| 12 | ∞ | 0.000 | | 2.250 |
| Image | ∞ | — | | |

In table 5, OKP4HT, E48R, and B270 are the same as table 1.

The aspherical surface coefficient for each surface derived using equation (1) is as shown in table 6.

TABLE 6

| Ri | K | A4 | A6 | A8 | A10 | A12 | A14 | A16 |
|---|---|---|---|---|---|---|---|---|
| 1st Surface | −2.580E−02 | −2.410E−02 | 2.190E−01 | −7.140E−01 | 1.090E+00 | −7.800E−01 | 2.810E−01 | −3.830E−01 |
| 3rd Surface | −2.650E+02 | 2.280E−01 | −6.410E−01 | 8.070E−01 | −6.620E−01 | −1.290E+00 | 1.890E+00 | |
| 4th Surface | 9.840E+02 | 2.950E−01 | −7.310E−01 | 6.660E−01 | −7.210E−01 | 2.110E−01 | −2.780E−01 | |
| 5th Surface | 7.170E−01 | 1.720E−01 | −3.310E−01 | 1.290E+00 | −2.940E+00 | 3.420E+00 | −4.750E−01 | −1.340E+00 |
| 6th Surface | 6.300E−02 | −9.130E−02 | 2.890E−01 | −1.020E+00 | 3.310E+00 | −3.480E+00 | 1.460E+00 | −9.540E−01 |
| 7th Surface | −3.900E−01 | −5.110E−03 | 1.940E−01 | −4.570E−01 | 8.060E−01 | −3.530E−01 | −8.460E−02 | 3.660E−02 |
| 8th Surface | 9.800E+00 | −1.140E−01 | 6.490E−02 | −1.540E−02 | 9.650E−04 | 1.610E−04 | 7.360E−06 | −9.710E−06 |
| 9th Surface | 1.060E−01 | −1.710E−01 | 6.440E−02 | −2.170E−02 | 4.260E−03 | −3.180E−04 | −6.020E−06 | −1.420E−06 |

The optical characteristics of the lens unit, more specifically, the spot diaphragm, field curvature, distortion aberration, vertical aberration, and MTF curves are respectively shown in FIGS. 15, 16A, 16B, 17, and 18.

Example 4

Referring to FIG. 19, in the lens unit of example 4, the image side surface 12 of the first lens 1 is convex at the image side, and the object side surface 21 of the second lens 2 is convex at the object side. In other words, the opposing surfaces of the first and second lenses 1 and 2 sandwiching the aperture stop 5 are both convex. Further, the image side surface 42 and object side surface 41 of the fourth lens 4 are each aspherical and each include at least one inflection point. Further, the object side surface 41 of the fourth lens has a central portion, which is convex at the object side, and a peripheral portion, which is concave at the object side. Accordingly, example 4 corresponds to the lens unit in the third embodiment. The design conditions of the lens unit are shown below.

Focal length of entire system: 3.483 mm
F-number: 2.8
Entire lens length: 4.42 mm
Back focus: 1.21 mm
Effective image height: Φ4.5 mm The lens data is shown in table 7. In table 7, a number i is allocated for each surface in order from the object side surface of the first lens 1, which serves as the first surface as shown in FIG. 19, toward the image side. Further, the parameters of Ri, Di, nd, and vd are the same as those of table 1.

TABLE 7

| Surface No. | Ri | Di | Material | Radius |
|---|---|---|---|---|
| Object | ∞ | ∞ | | |
| 1* | 1.277 | 0.600 | E48R | 0.776 |
| 2* | −5.784 | −0.005 | | 0.573 |
| 3 (Stop) | | 0.036 | | 0.522 |
| 4* | 288.877 | 0.326 | OKP4HT | 0.564 |
| 5* | 2.096 | 0.599 | | 0.618 |
| 6* | −1.021 | 0.519 | E48R | 0.756 |
| 7* | −0.904 | 0.380 | | 0.995 |
| 8* | 10.881 | 0.759 | E48R | 1.555 |
| 9* | 2.841 | 0.153 | | 1.874 |
| 10 | | 0.300 | B270 | 1.972 |
| 11 | | 0.753 | | 2.032 |
| 12 | | 0.000 | | |
| Image | ∞ | — | | |

In table 7, OKP4HT, E48R, and B270 are the same as tables 1 and 3.

The aspherical surface coefficient for each surface derived using equation (1) is as shown in table 8.

TABLE 8

| Ri | K | A4 | A6 | A8 | A10 | A12 | A14 | A16 |
|---|---|---|---|---|---|---|---|---|
| 1st Surface | −7.656E−02 | −2.481E−02 | 1.302E−01 | −5.113E−01 | 8.079E−01 | −8.465E−01 | 5.265E−01 | −5.300E−01 |
| 3rd Surface | −1.219E+02 | 1.695E−01 | −6.617E−01 | 7.391E−01 | −1.886E−01 | −2.232E+00 | 2.940E+00 | 0.000E+00 |
| 4th Surface | 7.166E+04 | 2.645E−01 | −6.350E−01 | 7.888E−01 | −6.216E−01 | −6.462E−01 | 1.603E+00 | 0.000E+00 |
| 5th Surface | −2.162E−01 | 1.285E−01 | −2.122E−02 | 7.976E−01 | −2.572E+00 | 4.221E+00 | 1.154E−02 | −3.718E+00 |
| 6th Surface | 1.216E−01 | −1.076E−01 | 2.737E−01 | −5.438E−01 | 2.738E+00 | −3.351E+00 | 2.343E−01 | 1.712E+00 |
| 7th Surface | −4.363E−01 | 4.664E−02 | 1.164E−01 | −2.360E−01 | 6.518E−01 | −3.511E−01 | −8.326E−02 | 6.947E−02 |
| 8th Surface | −5.863E+39 | −6.256E−02 | 5.342E−02 | −1.723E−02 | 1.082E−03 | 3.953E−04 | 3.299E−05 | −4.079E−05 |
| 9th Surface | 2.948E−01 | −1.546E−01 | 6.192E−02 | −2.112E−02 | 4.005E−03 | −2.778E−04 | −1.611E−05 | −4.192E−07 |

The optical characteristics of the lens unit, more specifically, the spot diaphragm, field curvature, distortion aberration, vertical aberration, and MTF curves are respectively shown in FIGS. 20, 21A, 21B, 22, and 23.

Example 5

Referring to FIG. 24, in the lens unit of example 5, the image side surface 12 of the first lens 1 is convex at the image side, and the object side surface 21 of the second lens 2 is convex at the object side. In other words, the opposing surfaces of the first and second lenses 1 and 2 sandwiching the aperture stop 5 are both convex. More specifically, the object side surface 21 of the second lens 2 has a central portion, which is concave at the object side, and a peripheral portion, which is convex at the object side. Accordingly, example 5 corresponds to the lens unit in the fourth embodiment. The design conditions of the lens unit are shown below.

Focal length of entire system: 3.580 mm
F-number: 2.8
Entire lens length: 4.42 mm
Back focus: 1.19 mm
Effective image height: Φ4.5 mm The lens data is shown in table 9. In table 9, a number i is allocated for each surface in order from the object side surface of the first lens 1, which serves as the first surface as shown in FIG. 24, toward the image side. Further, the parameters of Ri, Di, nd, and vd are the same as those of table 1.

TABLE 9

| Surface No. | Ri | Di | Material | Radius |
|---|---|---|---|---|
| Object | ∞ | ∞ | | |
| 1* | 1.303 | 0.625 | E48R | 0.792 |
| 2* | −5.617 | −0.015 | | 0.569 |
| 3 (Stop) | ∞ | 0.045 | | 0.537 |
| 4* | −73.649 | 0.323 | OKP4HT | 0.581 |
| 5* | 2.208 | 0.591 | | 0.638 |
| 6* | −1.055 | 0.518 | E48R | 0.762 |
| 7* | −0.903 | 0.358 | | 1.001 |
| 8* | 21.36 | 0.790 | E48R | 1.574 |
| 9* | 2.758 | 0.153 | | 1.894 |
| 10 | ∞ | 0.300 | B270 | 1.988 |
| 11 | ∞ | 0.733 | | 2.047 |
| 12 | ∞ | 0.000 | | 2.250 |
| Image | ∞ | — | | |

In table 9, OKP4HT, E48R, and B270 are the same as tables 1 and 3.

The aspherical surface coefficient for each surface derived using equation (1) is as shown in table 10.

TABLE 10

| Ri | K | A4 | A6 | A8 | A10 | A12 | A14 | A16 |
|---|---|---|---|---|---|---|---|---|
| 1st Surface | −2.124E−02 | −1.997E−02 | 1.301E−01 | −4.847E−01 | 8.349E−01 | −8.706E−01 | 5.475E−01 | −4.177E−01 |
| 3rd Surface | −1.772E+02 | 1.812E−01 | −6.419E−01 | 7.643E−01 | −1.762E−01 | −2.273E+00 | 2.825E+00 | 0.000E+00 |
| 4th Surface | −1.907E+05 | 2.612E−01 | −6.477E−01 | 7.816E−01 | −6.068E−01 | −6.981E−01 | 1.571E+00 | 0.000E+00 |
| 5th Surface | −1.208E+00 | 1.141E−01 | −7.741E−02 | 7.959E−01 | −2.340E+00 | 3.549E+00 | −1.608E+00 | −7.706E−02 |
| 6th Surface | 1.864E−01 | −1.224E−01 | 2.923E−01 | −6.501E−01 | 2.605E+00 | −2.935E+00 | 1.020E+00 | −3.856E−01 |
| 7th Surface | −4.477E−01 | 4.764E−02 | 1.007E−01 | −2.286E−01 | 6.629E−01 | −3.482E−01 | −9.401E−02 | 7.260E−02 |
| 8th Surface | −9.759E+39 | −5.977E−02 | 5.366E−02 | −1.725E−02 | 1.061E−03 | 3.793E−04 | 2.771E−05 | −3.354E−05 |
| 9th Surface | 2.743E−01 | −1.562E−01 | 6.210E−02 | −2.109E−02 | 3.999E−03 | −2.807E−04 | −1.588E−05 | −1.384E−08 |

The optical characteristics of the lens unit, more specifically, the spot diaphragm, field curvature, distortion aberration, vertical aberration, and MTF curves are respectively shown in FIGS. 25, 26A, 26B, 27, and 28.

The present invention is related to a lens unit optimal for use in a compact image capturing device. Thus, the present invention is industrially applicable to a lens unit for a compact camera or a mobile phone incorporating a camera.

It should be apparent to those skilled in the art that the present invention may be embodied in many other specific forms without departing from the spirit or scope of the invention. Particularly, it should be understood that the present invention may be embodied in the following forms.

In the above-described embodiment, each of the first to fourth lenses 1 to 4 is a plastic lens. However, some or all of the first to fourth lenses 1 to 4 may be glass lenses as long as the same optical characteristics can be maintained. The use of glass lenses increases heat resistance. Further, thermal volume changes are smaller in glass than plastic. This suppresses image deterioration caused by the lens shape that changes in accordance with the temperature.

The cover glass 6 does not necessarily have to be arranged between the fourth lens 4 and the CCD image sensor 7 like in the above-described embodiments. For example, a filter or the like that cuts infrared light may be used in lieu of or in addition to the cover glass 6.

In the above-described embodiment, the CCD image sensor 7 is used as the image capturing element. However, other structures may be used for the image capturing element. For example, a CMOS image sensor may be used.

In the above-described embodiment, the CCD image sensor 7 is used as the image capturing element. However, other structures may be used for the image capturing element. For example, an optical film may be used as the image capturing element in an image capturing device for silver salt photographs.

In the preferred embodiment, the lens unit is used in a portable terminal but may also be used in a normal camera or personal computer. Further, the image capturing device may be used not only for capturing still images but also for capturing moving pictures.

The present examples and embodiments are to be considered as illustrative and not restrictive, and the invention is not to be limited to the details given herein, but may be modified within the scope and equivalence of the appended claims.

What is claimed is:
1. A lens unit comprising:
a first lens having positive power;
an aperture stop;
a second lens having negative power;

a meniscal third lens having positive power; and a fourth lens including an object side surface and an image side surface, each being aspherical and each including at least one inflection point, with the image side surface being concave at an image side;

wherein the first lens, the aperture stop, the second lens, the third lens, and the fourth lens are arranged in order from an object side toward the image side;

the first lens includes an image side surface that is convex at the image side;

the second lens includes an object side surface that is convex at the object side; and the object side surface of the second lens includes a central portion that is concave at the object side and a peripheral portion that is convex at the object side.

2. The lens unit according to claim 1, wherein the object side surface of the fourth lens includes a central portion that is convex at the object side.

3. The lens unit according to claim 1, wherein the object side surface of the fourth lens includes a peripheral portion that is concave at the object side.

4. The lens unit according to claim 1, wherein the aperture stop is arranged further toward the object side from a surface peak in the image side surface of the first lens.

5. The lens unit according to claim 1, wherein the lens unit is included in an image capturing device.

6. The lens unit according to claim 1, wherein the convex object side surface of the second lens includes a portion that is symmetric with the convex image side surface of the first lens.

* * * * *